July 17, 1956
C. DODEGGE
2,755,084
TICKET MACHINES
Filed July 24, 1951
8 Sheets-Sheet 1
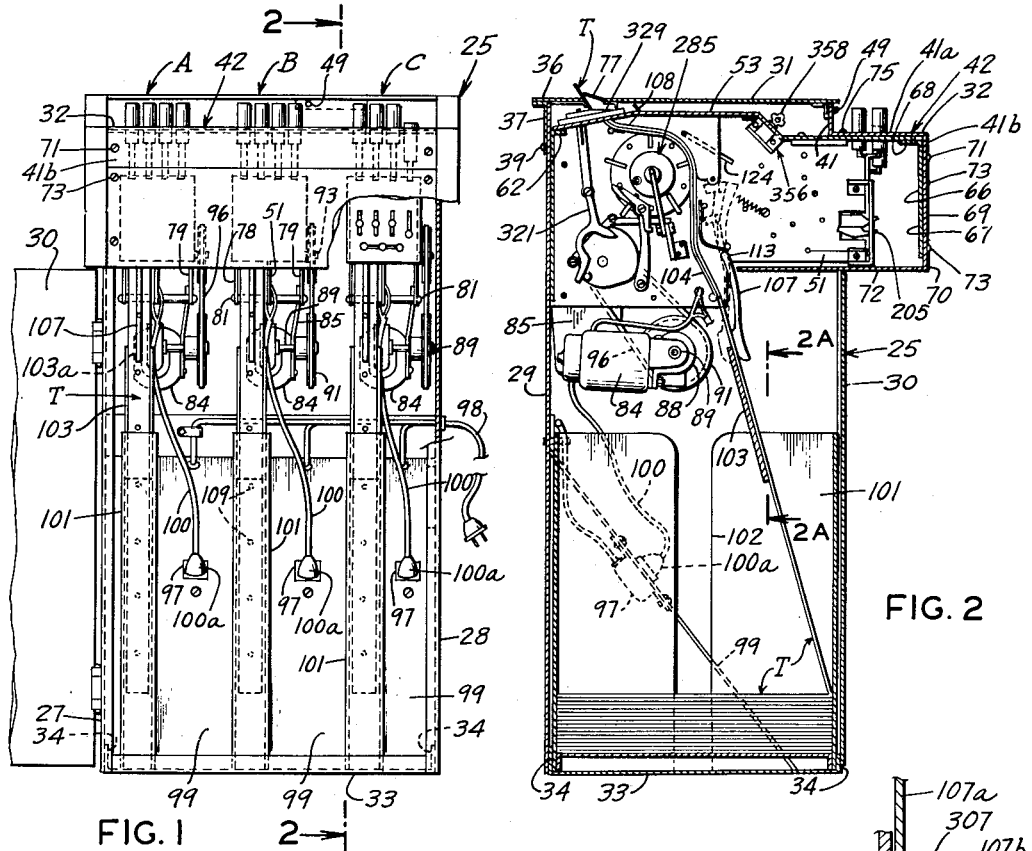
FIG. 1
FIG. 2
FIG. 2A
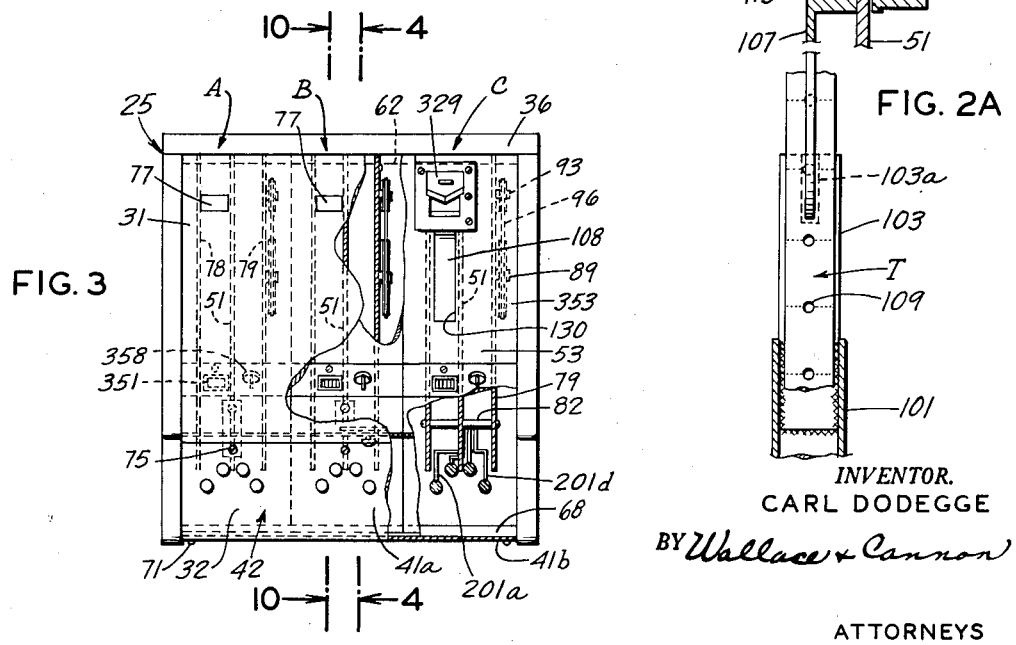
FIG. 3
INVENTOR.
CARL DODEGGE
BY Wallace & Cannon
ATTORNEYS

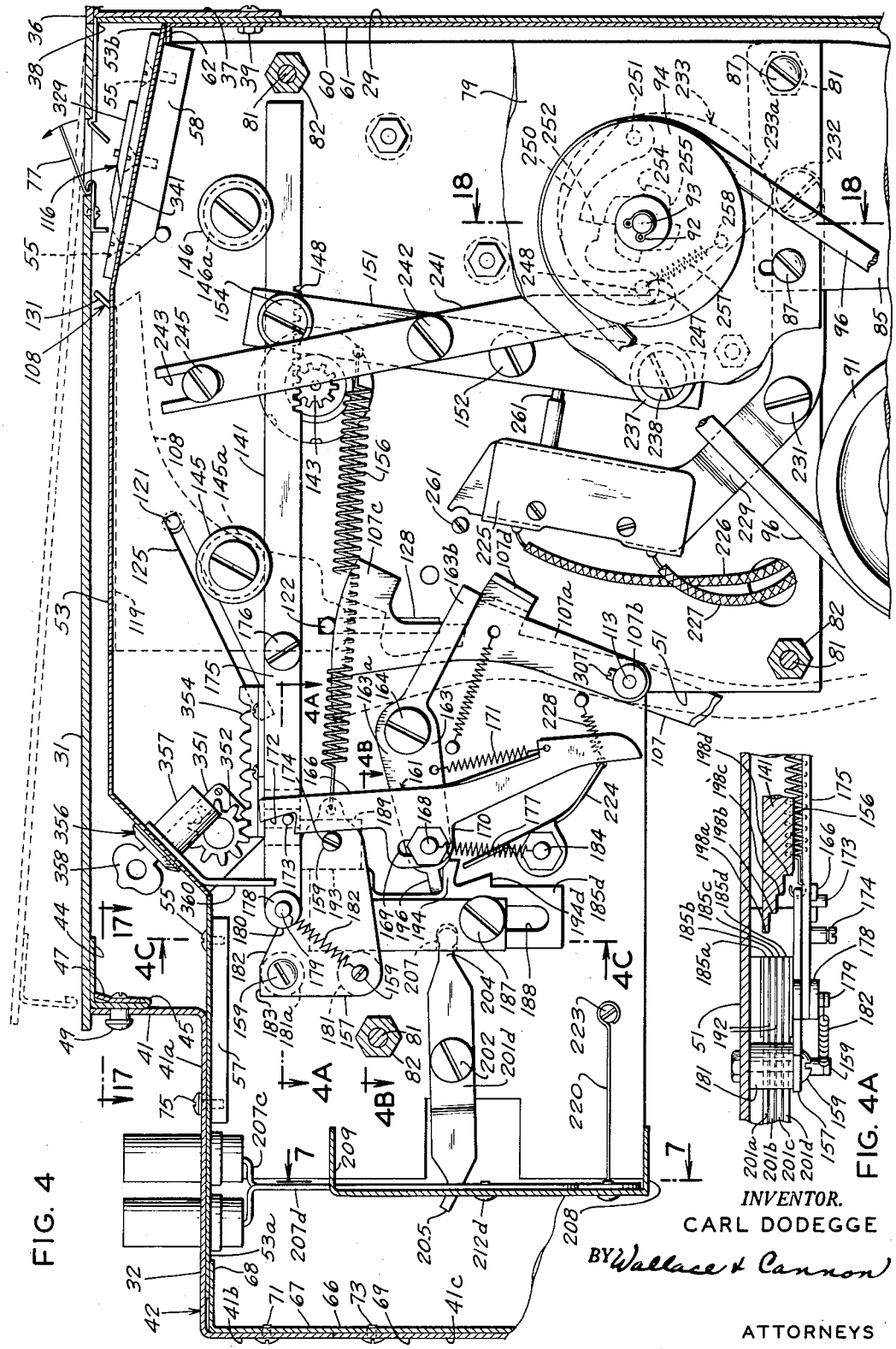
July 17, 1956. C. DODEGGE 2,755,084
TICKET MACHINES
Filed July 24, 1951 8 Sheets-Sheet 2
INVENTOR.
CARL DODEGGE
BY Wallace & Cannon
ATTORNEYS

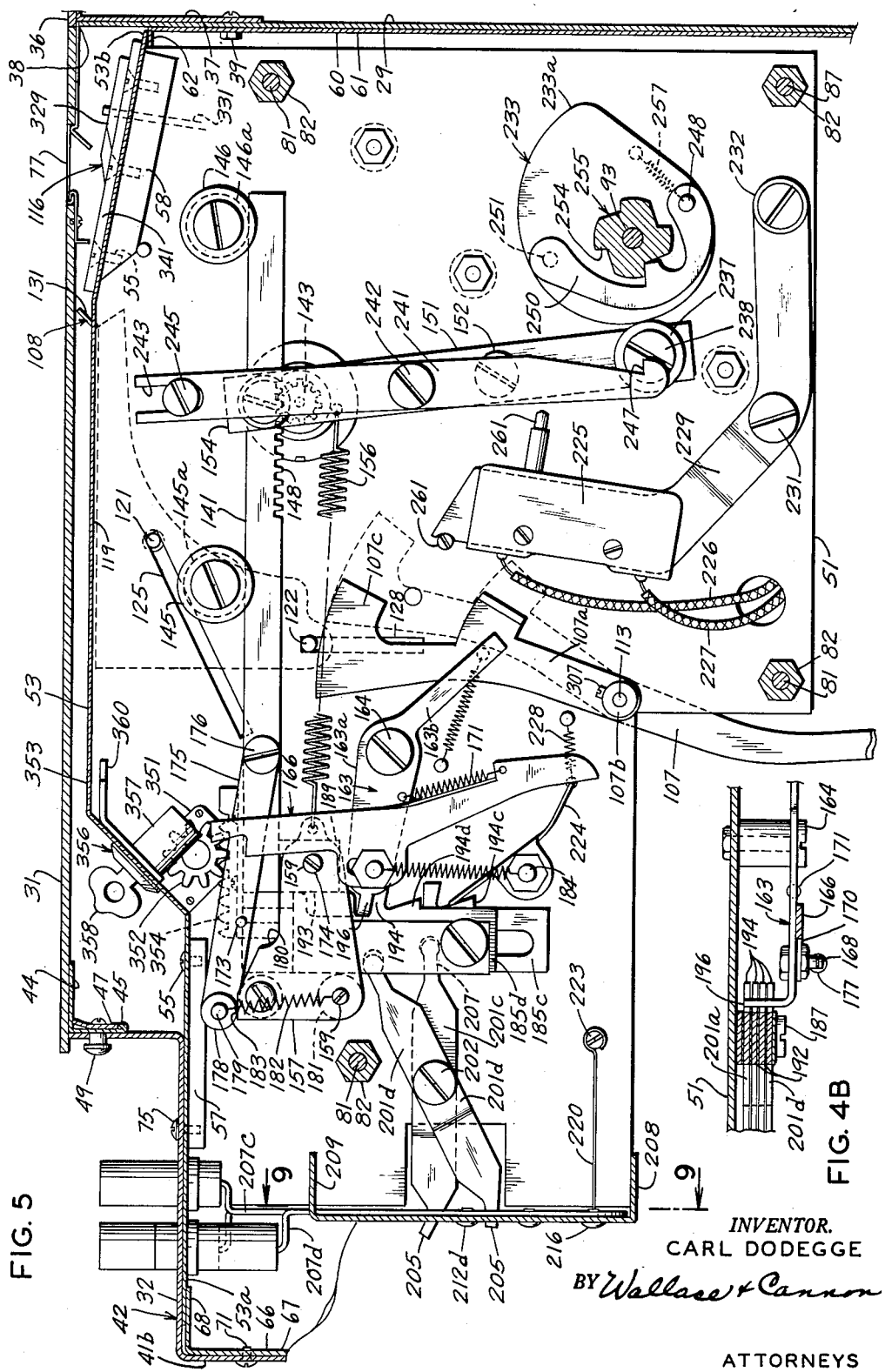

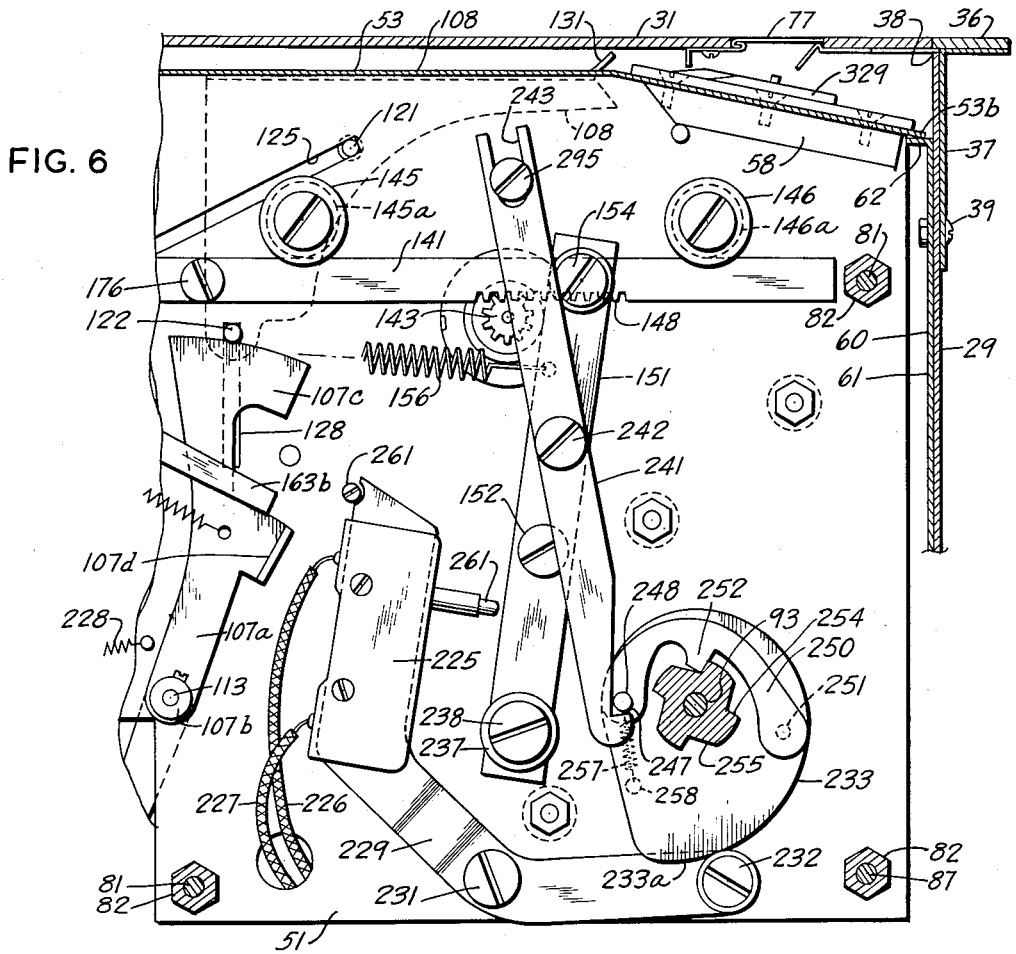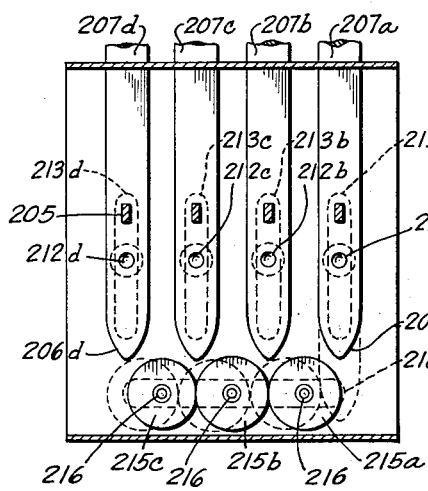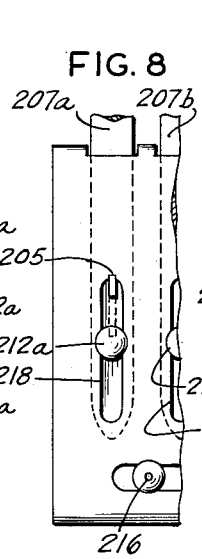

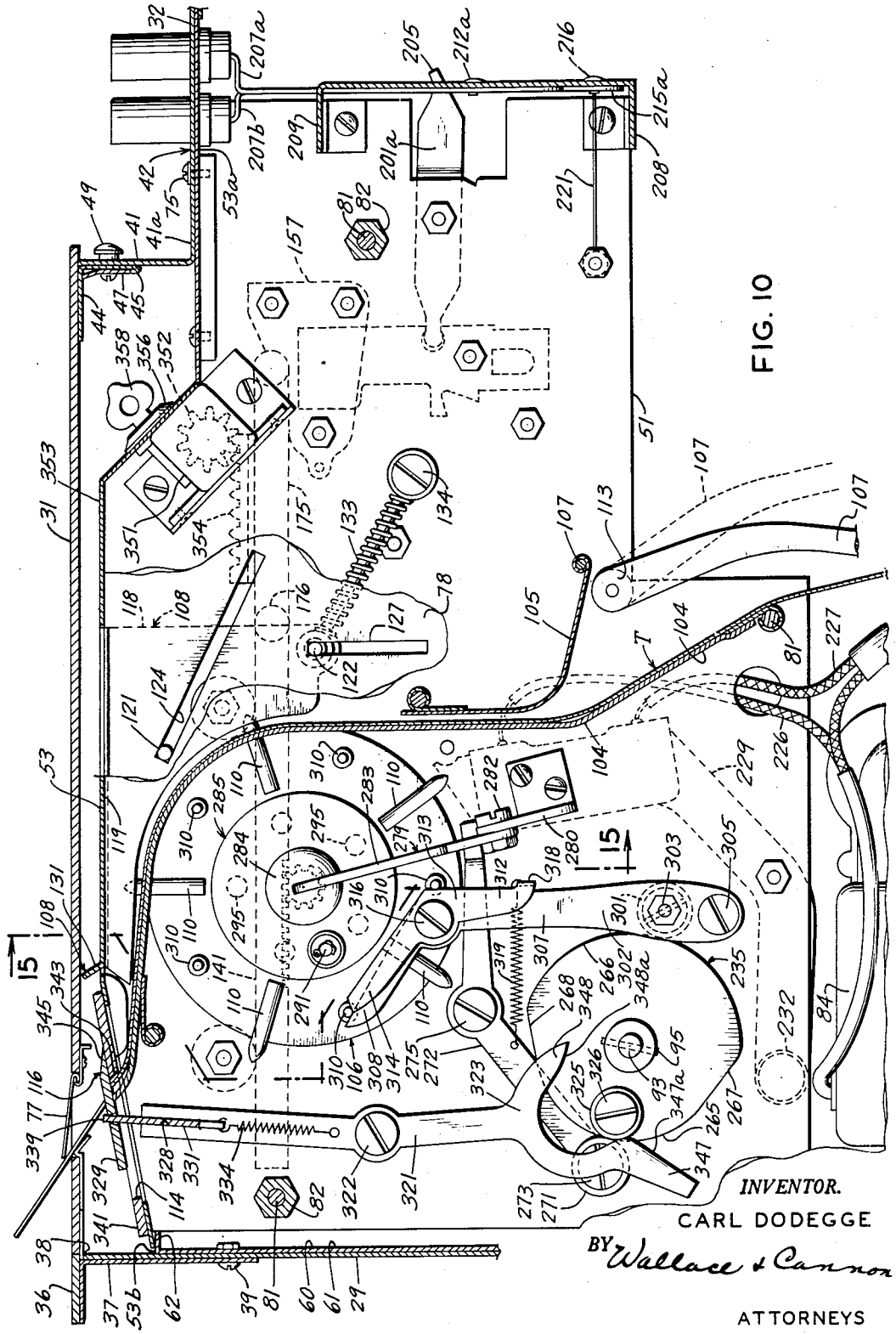

July 17, 1956  C. DODEGGE  2,755,084
TICKET MACHINES

Filed July 24, 1951  8 Sheets-Sheet 6

INVENTOR.
CARL DODEGGE
BY Wallace + Cannon
ATTORNEYS

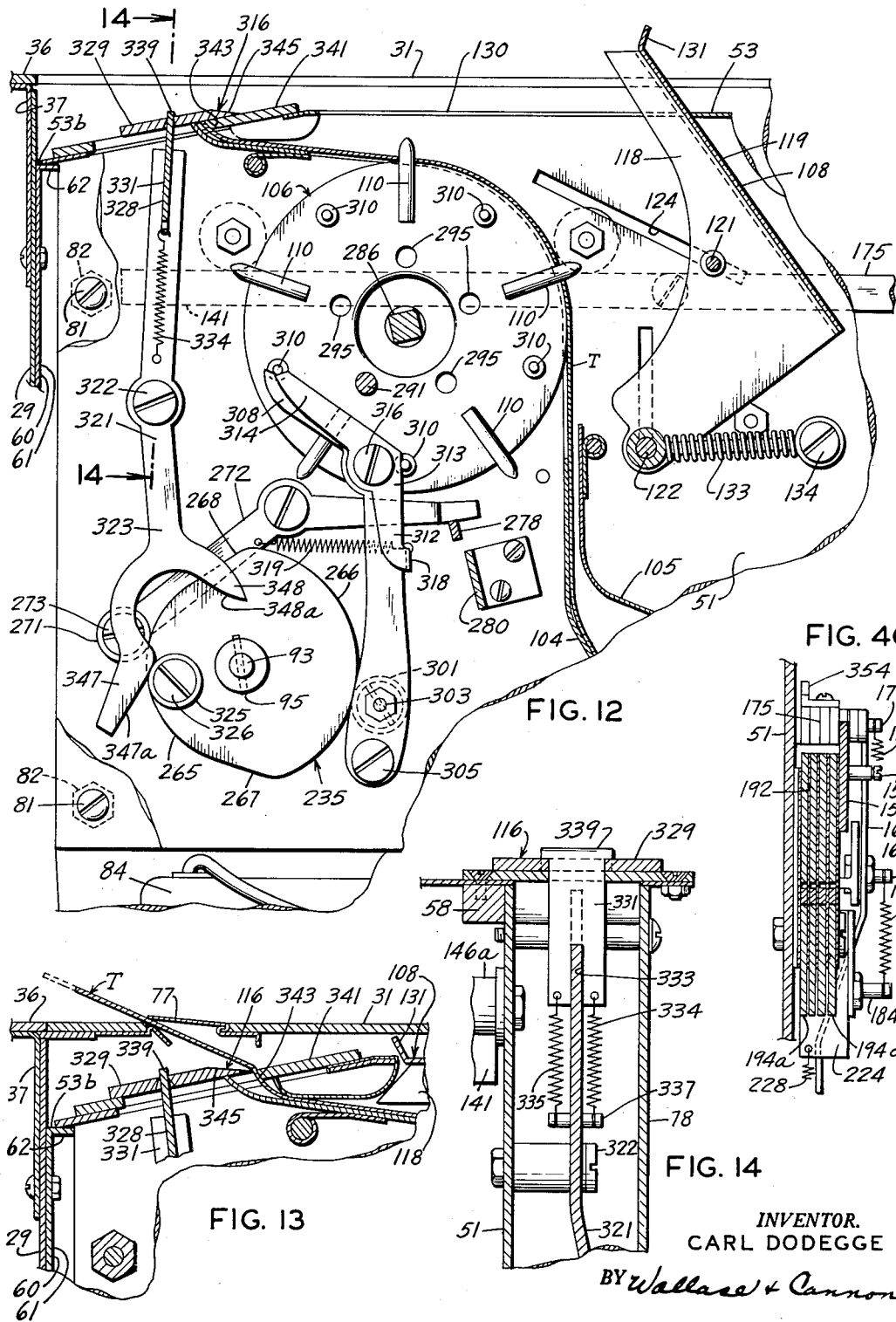

July 17, 1956
C. DODEGGE
2,755,084
TICKET MACHINES
Filed July 24, 1951
8 Sheets-Sheet 8
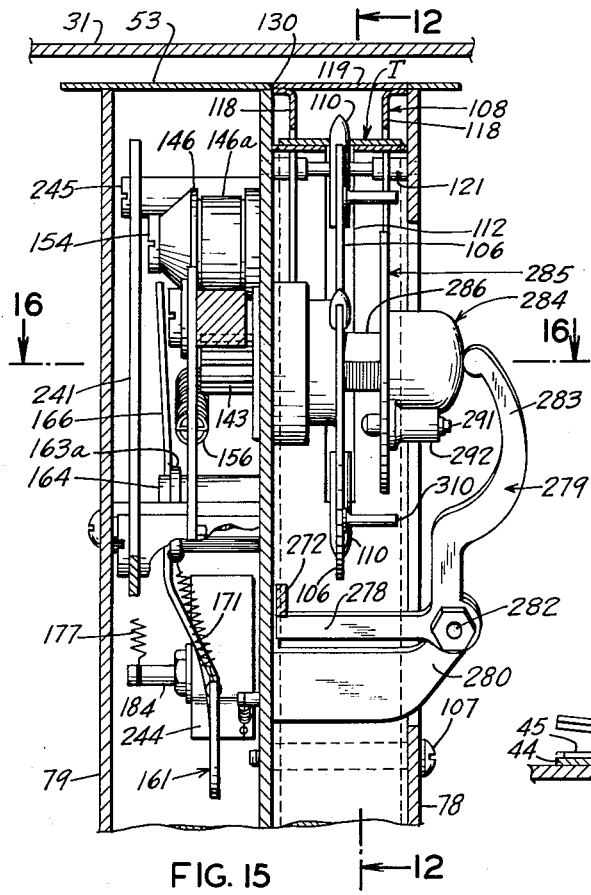
FIG. 15
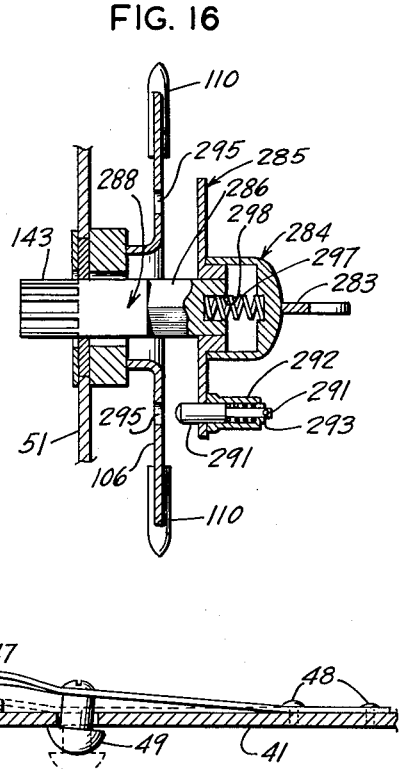
FIG. 16
FIG. 17
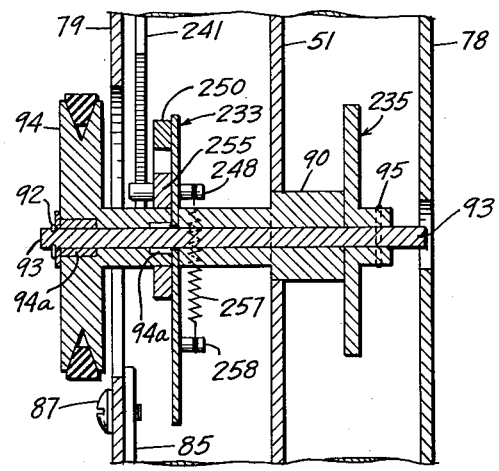
FIG. 18
*INVENTOR.*
CARL DODEGGE
BY Wallace & Cannon
ATTORNEYS United States Patent Office 2,755,084
Patented July 17, 1956

2,755,084

TICKET MACHINES

Carl Dodegge, Maywood, Ill., assignor to
William F. O'Keeffe, Chicago, Ill.

Application July 24, 1951, Serial No. 238,273

12 Claims. (Cl. 271—2.4)

This invention relates to ticket issuing machines and more particularly to that type of ticket issuing machine embodying a plurality of keys and adapted to automatically issue a predetermined number of tickets upon actuation of one of the keys; the number of issued tickets depending upon the key actuated.

The present invention is an improvement upon the ticket machines which form the subject matter of my United States Patent No. 2,321,545, granted June 8, 1943, and my United States Patent No. 2,419,012, granted April 15, 1947.

Ticket issuing machines of the character involved herein are primarily intended for use in theaters and the like, where it is desirable to use machines which are capable of issuing tickets of various denominations and which accurately register the number of different tickets so issued.

It is a primary object of my invention to provide a novel, practical and efficient ticket issuing machine embodying a plurality of associated ticket issuing units, each of which units is adapted to issue tickets of a given denomination and each of which will accurately register the number of tickets of that denomination which are so issued.

A further object of the present invention is to provide a new and improved ticket issuing machine which embodies a plurality of self-contained and independently operable ticket issuing units each of which embodies its own electric motor and operating mechanisms constituted and arranged in a novel and expeditious manner and is removably mounted in the machine so that it may readily be removed from the machine as a unit without disabling the other ticket issuing units embodied in the same machine.

A further object is to afford a novel ticket issuing machine embodying a horizontally reciprocable rack bar which is operable to drive the ticket issuing feed reel through a cycle of operation.

Yet another object is to provide a novel ticket issuing machine of the aforementioned type which embodies novel control mechanism constituted and arranged in a novel and expeditious manner for controlling the reciprocation of the aforementioned rack bar.

An object ancillary to the foregoing is to provide a novel ticket machine embodying novel key mechanism and trigger mechanism in the control mechanism thereof, and wherein the key mechanism and trigger mechanism are constituted and arranged in a novel and expeditious manner to afford novel, practical and efficient actuating mechanism for the aforementioned control mechanism.

Another object is to afford a novel ticket issuing machine embodying a novel ticket-exhaust detector constituted and arranged in a novel and expeditious manner.

Another object is to afford novel control mechanism for starting and stopping the electric motor of each ticket issuing unit.

A further object is to provide a novel ticket issuing machine embodying novel clutch mechanism for controlling the operative engagement of the electric motor with the ticket issuing mechanism of each unit.

Yet another object is to provide a novel ticket issuing machine embodying novel holding means for holding and properly positioning the ticket issuing reel.

A further object of my invention is to construct a novel ticket issuing machine embodying novel severing mechanism for separating issued tickets from the supply of tickets carried in the machine.

Other and further objects of the present invention will be apparent from the folowing description and claims and are illustrated in the accompanying drawings which, by way of illustration, show a preferred embodiment of the present invention and the principle thereof and what I now consider to be the best mode in which I have contemplated applying that principle. Other embodiments of the invention embodying the same or equivalent principle may be used and structural changes may be made as desired by those skilled in the art without departing from the present invention and the purview of the appended claims.

In the drawings:

Fig. 1 is a front elevational view of a three-unit ticket machine embodying the principles of my invention with certain parts broken away and the front door shown in open position;

Fig. 2 is a longitudinal sectional view taken substantially along the line 2—2 in Fig. 1;

Fig. 2A is a detail sectional view taken substantially on the line 2A—2A in Fig. 2;

Fig. 3 is a top plan view of the machine shown in Fig. 1 with certain parts broken away to show the underlying construction;

Fig. 4 is a view partly in section of the upper portion of a unit in my machine and taken substantially along the line 4—4 in Fig. 3, and shows the parts on the rack side of the unit as they appear in normal position prior to the initiation of a cycle of operation;

Fig. 4A is a detail section view taken substantially along the line 4A—4A in Fig. 4;

Fig. 4B is a detail sectional view taken substantially on the line 4B—4B in Fig. 4;

Fig. 4C is a detail sectional view taken substantially on the line 4C—4C in Fig. 4;

Fig. 5 is a view similar to Fig. 4 and shows the position of the parts as they would appear after approximately one-quarter of a complete cycle of operation;

Fig. 6 is a view similar to Fig. 5 and shows the position of the parts as they would appear after approximately four-fifths of a complete cycle of operation;

Fig. 7 is a detail sectional view taken substantially along the line 7—7 in Fig. 4;

Fig. 8 is a detail view of the reverse side of the mechanism shown in Fig. 7;

Fig. 9 is a detail sectional view showing the mechanism shown in Fig. 7 in a different operative position corresponding to the position of the parts shown in Fig. 5;

Fig. 10 is a view partly in section of the upper portion of one unit of my machine, taken substantially on the line 10—10 of Fig. 3, and shows the parts on the reel side of the unit as they appear in their normal position prior to the initiation of a cycle of operation;

Fig. 12 is a view similar to Fig. 10 and shows the parts as they would appear after approximately four-fifths of a complete cycle of operation;

Fig. 13 is an enlarged detail sectional view of a portion of the mechanism shown in Fig. 10;

Fig. 14 is a detail sectional view taken substantially along the line 14—14 in Fig. 12;

Fig. 15 is a detail sectional view taken substantially along the line 15—15 in Fig. 10;

Fig. 16 is a detail sectional view taken substantially along the line 16—16 in Fig. 15;

Fig. 17 is a detail sectional view taken substantially along the line 17—17 in Fig. 4; and Fig. 18 is a detail sectional view taken substantially along the line 18—18 in Fig. 4.

Figure 11:
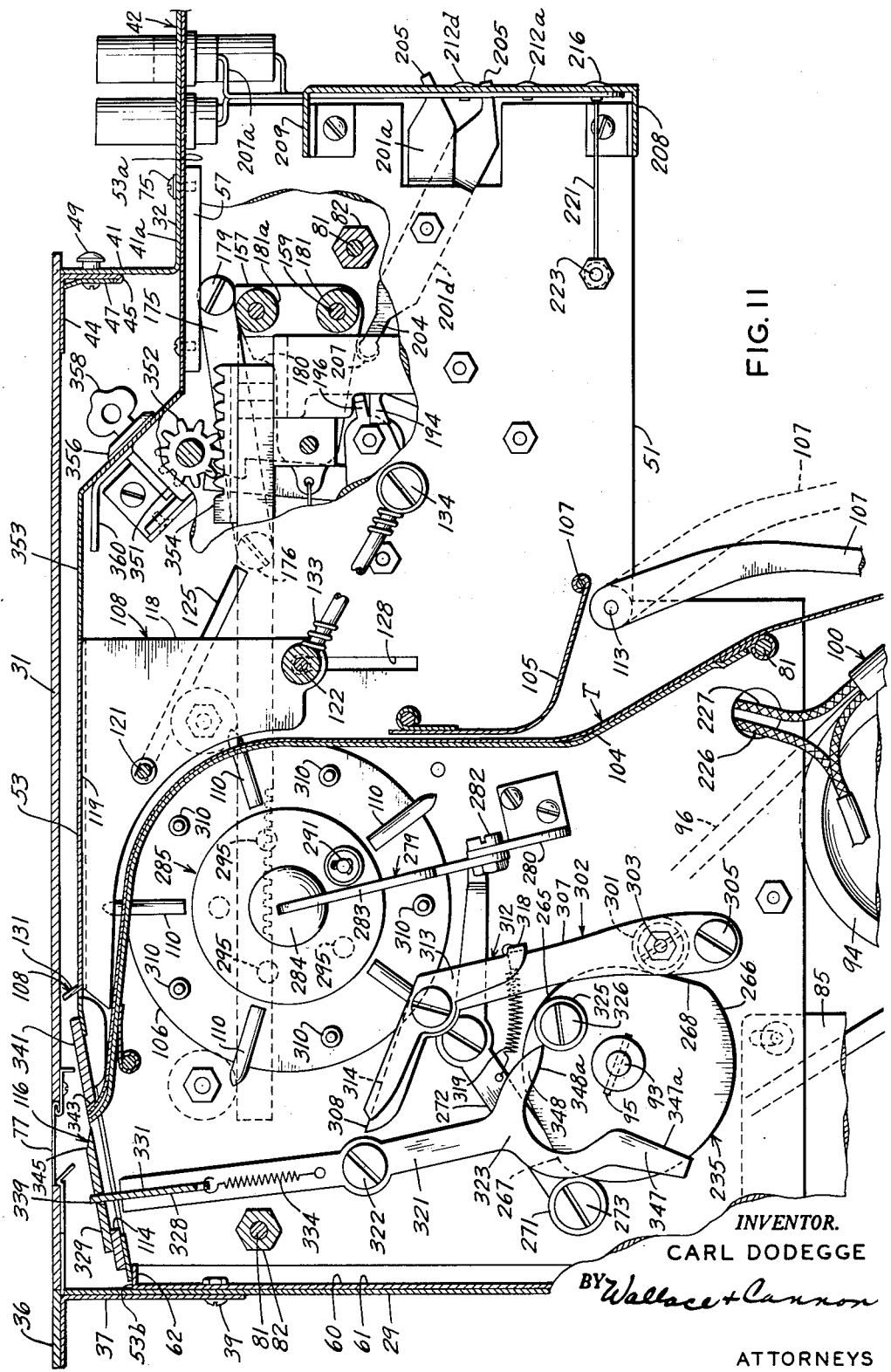
Fig. 11 is a view similar to Fig. 10 and shows the position of the parts as they would appear after approximately one-quarter of a complete cycle of operation.

The machine shown in the accompanying drawings comprises a casing 25 which embodies three-ticket issuing units A, B, and C. The ticket issuing units A, B, and C are identical in operation and construction, and, therefore, for the purpose of describing my invention, it will only be necessary to describe the operation of one unit thereof, and identical reference numerals will be given to the same parts on the different units. It will be understood that a machine having a greater or lesser number of ticket issuing units may be used without departing from the purview of my invention, and that a three-unit machine is shown here merely for the purpose of illustration.

*General construction of the machine*

The casing 25 has side walls 27 and 28, a rear wall 29, a front wall or door 30, a cover or top wall 31, a front arm rest 32, and a bottom wall 33. The bottom wall 33 has suitable upwardly projecting flanges 34 disposed at the edge portions thereof, and the side walls 27 and 28 and the rear wall 29 are secured to the corresponding flange 34 by suitable means such as welding, the front flange 34 affording a stop for the door 30, Fig. 2. The side walls 27 and 28 and the rear wall 29 are preferably formed from a single piece of suitable material, such as, sheet steel, formed to shape, and a trim strip 36, Figs. 2, 3, and 4 is mounted on and supported by an angle bracket 37 in overlying outwardly projecting relation to the upper edge portion of the rear wall 29, to thereby afford a space 38, Fig. 4, between the inner edge portion of the trim strip 36 and the top edge of the rear wall 29, the bracket 37 being secured to the rear wall 29 by suitable means such as rivets 39.

The top wall or cover plate 31 is normally disposed in horizontal position between the upper edge portions of the side walls 27 and 28 in alignment therewith, the rear edge portion thereof removably mounted in the slot 38 afforded between the trim strip 36 and the upper edge portion of the rear wall 29, and the front edge portion of the cover plate 31 resting on the upper edge of a vertically disposed leg 41 of a substantially Z-shaped bracket 42, the intermediate leg 41a of which forms the upper surface of the arm rest 32, Figs. 2 and 4. An angle bracket 44, Figs. 4 and 17, having an upwardly turned flange 45 on the lower free edge portion thereof, is mounted on the lower face of the cover plate 31 in depending relation thereto in position to be disposed adjacent to the leg 41 of the bracket 42 when the cover plate 31 is disposed in closed position. A strip 47 of suitable material, such as, for example, steel is mounted on the inner face of the leg 41 of the bracket 42 by rivets 48 extending through one end portion of the strip 47, the other end portion of the strip 47 being normally disposed adjacent to the inner face of the leg 41 in such position that when the cover plate 31 is in closed position, the downwardly projecting leg of the angle bracket 44 is disposed between the strip 47 and the adjacent leg 41, with the flange 45 disposed below, and in abutting relation to, the lower edge of the strip 47. The strip 47 is made of suitable resilient material, such as, for example, sheet steel and a push button 49 is mounted thereon and projects outwardly through the leg 41 of the bracket 42 in such position that pressure on the button 49 is effective to spring the free end of the strip 47 inwardly out of engagement with the flange 45 from the position shown in Fig. 4 to the position shown in solid lines in Fig. 17, to thereby permit the front end portion of the cover plate 31 to be raised as shown in dotted lines in Fig. 4, from which position the cover plate 31 may be removed from the casing 25 by movement in a forward direction from the slot 38 between the trim strip 36 and the rear wall 29.

The units A, B, and C each have a supporting plate 51, Figs. 1, 3 and 4, which comprises the central supporting member for the working parts of that unit, and a top plate 53 is mounted in horizontal position on the upper edge of the supporting plate 51 by suitable means such as, screws 55 extending through the top plate 53 into brackets 57 and 58 mounted on the front and rear top edge portions, respectively, of the supporting plate 51, Fig. 4.

An angle bracket 60, Figs. 2 and 4, having a vertically disposed leg 61 and a horizontally disposed leg 62, is mounted on the inner face of the rear wall 29 and extends substantially entirely thereacross with the leg 62 projecting inwardly from the rear wall 29 and disposed near, but spaced from, the upper edge of the rear wall 29 for a purpose which will be discussed in greater detail presently.

In addition to the vertical leg 41 and the intermediate leg 41a, the Z-shaped bracket 42 includes another vertical leg 41b on the other side thereof and which projects downwardly therefrom to form the upper part of the front wall of the arm rest 32. An angle bracket 66, having a substantially vertically disposed leg 67 and a horizontally disposed leg 68, is mounted on the inner face of the leg 41b with the horizontal leg 68 projecting inwardly therefrom adjacent to but in downwardly spaced relation to the horizontal leg 41a of the Z-shaped bracket 42. The upper end portion of the leg 67 of the angle bracket 66 is attached to the leg 41b of the bracket 42 by screws 71, and the lower end portion thereof is attached by screws 73 to the vertical leg 69 of an angularly formed supporting member 70 which has a horizontally disposed leg 72 projecting rearwardly into the casing 25. The vertical leg 69 of the member 70 forms the portion of the front face of the arm rest 32 between the leg 41b of the bracket 42 and the door 30, and the horizontal leg 72 of the member 70 forms the bottom wall of the forwardly projecting portion of the arm rest 32, Fig. 2. It will be seen that in order to remove the bracket 42 from the arm rest 32, it is only necessary to remove the screws 73 and 75 and open the cover plate 31, whereupon the bracket 42 may be lifted from its normal position in the arm rest 32.

The top plates 53 of the ticket issuing units A, B, and C each embody end portions 53a and 53b, respectively, which project longitudinally from the front and rear edge portions of the supporting plates 51, respectively. When the ticket issuing units A, B, and C are operatively disposed in the casing 25, the front and rear end portions 53a and 53b of the top plates 53 thereof rest on the flanges 68 and 62 of the brackets 66 and 60, respectively, to thereby support the units A, B, and C in operative position in the casing 25. When the units A, B, and C are so disposed in the casing 25, the horizontal leg 41a of the bracket 42 overlies the front end portion 53a of the top plate 53 in closely fitting relation to thereby hold the top plate 53 against vertical movement away from the brackets 66 and 60. The units A, B, and C are preferably held against lateral movement relative to the brackets 66 and 60 by means of screws 75, Fig. 4, extending through the horizontal leg 41a of the bracket 42 and the front end portion 53a of the top plate 53 into the bracket 57 mounted on the upper front end portion of the supporting plate 51.

It will be seen that by first removing the cover plate 31 of the casing 25 and then removing the screws 73 and 75 the bracket 42 may be removed from the casing 25 to thereby permit the units A, B, and C to be inserted into or removed from the casing 25 in a vertical direction.

The cover plate 31 of the three-unit machine shown in the accompanying drawings has three trap doors 77, one of which is disposed above each of the units A, B, and C, and through which tickets are issued to a customer during the operation of my machine.

Each of the units A, B, and C includes two side plates 78 and 79 of substantially the same shape as the supporting plate 51, the side plates 78 and 79 being mounted on opposite sides of the supporting plate 51 in spaced relation thereto by suitable means such as, bolts 81 extending through the plates 78 and 79 into suitably threaded spacing blocks 82 secured to and projecting outwardly from opposite sides of the supporting plate 51.

Each of the units A, B, and C includes an electric motor 84, Figs. 1 and 2, mounted on and suspended from the lower edge portion of the side plate 79 by means of a suitable bracket 85, Figs. 1, 2 and 4, secured to the lower edge portion of the side plate 79 by bolts 87. Reduction gears, not shown, are enclosed within the housing 88 on each motor 84 and a drive shaft 89 projects horizontally therefrom and has a drive pulley 91 pinned or otherwise secured to the free end portion thereof. The drive shaft 89 and the pulley 91 afford driving means for the respective units A, B, and C as will be presently described.

Each of the units A, B, and C has a drive shaft 93, Figs. 4 and 18, which is journaled in a bearing 90 mounted in the supporting plate 51. A pulley 94 is rotatably mounted on one end portion of the drive shaft 93, the pulley 94 having an integral hub portion projecting inwardly therefrom to afford a mounting for a ratchet wheel 255, and suitable bearings 94a being mounted in the pulley 94 at opposite ends thereof. The pulley 94 is releasably restricted from outward movement on the drive shaft 93 by a spring clip 92, and the inner face of the ratchet wheel 255 is disposed in engagement with the outer face of a cam 233 welded or brazed to the shaft 93 on one side of the supporting plate 51, Fig. 18. The inner face of the cam 233 abuts one end of the bearing 90, and another cam 235 is mounted on the drive shaft 93 in abutting engagement with the other end of the bearing 90 on the opposite side of the supporting plate 51 from the cam 233. The cam 235 is secured to the drive shaft 93 for rotation therewith by a pin 95 and, thus, it will be seen that when the cam 233 is operativeyl coupled to the pulley 94 for rotation therewith during rotation of the latter, as will be presently discussed, the cam 233 is effective to rotate the drive shaft 93 and, therefore, the cam 235.

As best seen in Figs. 1 and 2, three upwardly extending partition walls 99 are disposed in spaced relation in the lower end portion of the casing 25, extending at an oblique angle to the horizontal between the bottom wall 33 and the rear wall 29 thereof. One of the partition walls 99 is positioned closely adjacent to the side wall 28 of the casing 25, Fig. 1, and the other two partition walls 99 are spaced therefrom to the left, as viewed in Fig. 1, the most leftwardly disposed partition wall 99 being spaced from the other side wall 27 of the casing 25. Each of the partition walls 99 has an electric socket 97, Figs. 1 and 2, mounted thereon which is connected to a power line or cord 98 by which the sockets may be connected to a suitable source of electrical energy such as the usual wall plug, not shown. Each of the motors 84 has a power line or cord 100, including a plug 100a, which may be readily connected to, and disconnected from a respective one of the sockets 97. Thus it will be seen that each of the units A, B, and C may be quickly and easily individually connected to, and disconnected from, the source of electrical energy.

Each of the ticket issuing units A, B, and C includes a ticket magazine 101, Figs. 1 and 2, which is adapted to hold a supply of folded tickets T. Each of the magazines 101 is open at the top and has a slot 102 in one side wall thereof, through which an operator's fingers may be inserted to facilitate the positioning of the tickets therein, and each of the magazines 101 includes an elongated plate 103 mounted in and projecting upwardly from the upper end portion thereof, Figs. 2 and 2A, to afford a guide-surface for tickets drawn from the respective magazine 101. Each of the plates 103 has an elongated slot 103a formed therein for a purpose which will be presently discussed.

The magazine 101 for the ticket issuing unit A is disposed between the side wall 27 and the adjacent partition wall 99 and is supported thereby in upright position. The magazines 101 for each of the units B and C are disposed in respective spaces between adjacent partition walls 99, as best seen in Fig. 1, and are supported thereby in corresponding vertically disposed position. Each of the magazines 101, when the door 30 is opened, may be removed forwardly from the casing 25, when it is desired to place a new supply of tickets therein.

As heretofore mentioned, when tickets are to be inserted in the magazines 101, the door 30 of the casing 25 may be opened and the magazines removed from the casing. A new supply of folded tickets T may then be placed in the magazine 101 and the leading end portion of the new end of the tickets T is then threaded upwardly from the magazine 101 upwardly across the front face of a plate 103 and to the rear of the lower end portion of a lever 107 pivotally mounted on the reel side of the supporting plate 51 on a shaft 113 journalled in the lower end portion of the supporting plate 51, Figs. 2, 2A and 10, the plate 103 and the lever 107 affording a ticket-exhaust detector as will be discussed in greater detail hereinafter. From the plate 103 the leading end of the tickets T is then threaded upwardly onto the front face of a shield 104, Figs. 2 and 10, and over a reel or ticket issuing wheel 106, below a guard 108 which maintains the ticket strip in engagement with the shield 104 over the reel 106. A guide plate 105 mounted on the supporting plate 51 by screws 107 in relatively closely adjacent relation to the front face of the shield 104 assists in retaining the strip of tickets T in proper relation to the shield 104.

The strips of tickets T commonly used in machines of this character have holes or openings 109, as best seen in Fig. 1, between each pair of tickets, and the reel 106 has pins 110 extending from the periphery thereof which are so spaced therearound that consecutive pins 110 on the reel 106 are adapted to engage holes 109 between corresponding consecutive pairs of tickets positioned upon the shield 104 outwardly of the reel 106. The shield 104 has a slot 112, Fig. 15, through which the pins 110 on the reel 106 protrude so as to engage the tickets T which are threaded over the shield 104, and in the operation of my machine, it is the advancement of a predetermined proper number of pins 110 upwardly through the slots 112, by controlling the rotation of the reel 106, which effects the issuance of a predetermined number of tickets, as will be presently described. As best shown in Fig. 10, during a ticket issuing operation of my machine, the tickets to be issued are pushed upwardly over the upper end portion of the shield 104 by the pins 110 on the reel 106 and outwardly through a slot 114 in a plate 341, mounted on the top plate 53, and through the trap door 77, where they may be grasped and withdrawn by the customer after being severed from the tickets remaining in the machine by a knife 116.

The guard 108 acts, as previously stated, to maintain the ticket strip T in engagement with the shield 104 over the slot 112 therein, to insure that the pins 110 on the reel 106 which protrude through the slot 112 will engage the holes 109 on the ticket strip T.

The guard 108 consists of two strips or plates 118, Figs. 10, 12 and 15, which are secured to each other in spaced relationship by a top plate 119, and are curved to fit around the shield 104 and the reel 106 in close relationship thereto at that portion of the shield 104 which curves over the reel 106 as best shown in Fig. 10. The guard 108 is slidably and pivotally mounted above the shield 104 by a pin-and-slot connection with the supporting plate 51 and the side plate 78. Two pins 121 and 122, Figs. 10 and 11, are mounted in and extend through the guard 108. The opposite end portions of the pin 121 are disposed in slots 124 (Fig. 10) and 125 (Fig. 11) in the side plate 78 and the supporting plate 51, respectively. Similarly, the opposite end portions of the pin 122 are disposed in slots 127 (Fig. 10) and 128 (Fig. 11) in the side plate 78 and the supporting plate 51, respectively. The top plate 119 of the guard 108 is normally disposed in the opening 130, Figs. 3 and 30, in the top plate 53, to form, in effect, a part of the latter. A lip 131 projects upwardly from the front edge portion of the guard 108 and affords a finger grip by means of which the guard 108 may be pivoted around the pins 121 and 122 to swing the guard 108 into open position as shown in Fig. 12 whereby access may be had to the reel 106 through the opening 130 in the top plate 53. A tension coil spring 133 is connected at one end to the pin 122 and at the other end by a screw 134 to the supporting plate 51. The spring 133 is normally effective to yieldingly retain the guard 108 in its normal closed position wherein it is disposed in relatively closely overlying relation to the guide 104, as best shown in Figs. 10 and 11. However, when it is desired to move the guard 108 away from the guide 104, such as, for example, for the purpose of threading a new strip of tickets over the reel 106, this may be readily accomplished by opening the cover plate 31 of the casing 25 and, by grasping the lip 131 of the guard 108 and pulling forwardly thereon, cause the guard 108 to pivot and slide on the pins 121 and 122 in the slots 124 and 125, and 127 and 128, respectively, from the closed position shown in Figs. 10 and 11 to the open position shown in Fig. 12. When the guard 108 is disposed in fully open position as shown in Fig. 12 the pin 121 has passed over dead-center position with relation to the pin 122 so that spring 133 is ineffective to move the guard 108 back to closed position without manual assistance and, therefore, the guard 108 will remain open until manually moved toward closed position, at which time the spring 133 is effective to assist in this latter movement.

The casing 25 and the general association of the units A, B, and C of my machine having been described, a more detailed description of the construction and operation of the various ticket issuing units will now be made. As has been previously stated, each of the units A, B, and C of my machine are identical in construction and operation, and, therefore, for a complete understanding of the construction and operation of my machine, it will only be necessary to describe the construction and operation of one of them together with the manner in which the various units are associated.

*Description of the ticket issuing units*

As is best seen in Figs. 4, 5, 6 and 15, a rack or rack bar 141 is mounted for substantially longitudinal horizontal movement between a pinion 143 and two guide rollers 145 and 146. The rack 141 has teeth 148 formed in the lower face thereof which are disposed in operative engagement with the teeth on the pinion 143. The guide rollers 145 and 146 have grooves 145a and 146a formed therein, respectively, Figs. 4 and 15, and the upper edge portion of the rack 141 is disposed in the grooves 145a and 146a, the rollers 145 and 146 being disposed in horizontally spaced relation to each other on opposite sides of the pinion 143. Thus, it will be seen that the rack 141 is effectively supported for longitudinal movement in a substantially horizontal direction and during such movement is effective to rotate the pinion 143.

The rack 141 may properly be termed the principal, or basic working part of each of the units A, B, and C of my machine because it is the operation of this member upon which the operation of the ticket issuing units of my machine directly depend, and it is the variation of the movement of the rack 141 which determines the number of tickets which will be issued in a cycle of operation of my machine. This side of the supporting plate 51 upon which the rack 141 is mounted, will be hereafter referred to as the "rack side" of the unit, as distinguished from the side on which the ticket issuing reel 106 is mounted (Figs. 10, 11 and 12), and which will hereafter be referred to as the "reel side" of the unit.

In its normal or non-ticket issuing position, the rack 141 is disposed in its most rearwardly disposed position, Fig. 4, that is, it is disposed in its extreme movement to the right as viewed in Fig. 4. A lever 151 pivotally mounted on the rack side of the supporting plate 51 by a pin 152, extending through the central portion of the lever 151 into the supporting plate 51, is pivotally connected at one end by a pin 154 to the rack 141. A tension spring 156 has one end connected to the lever 151 and has the other end connected to a bracket 157 mounted by screws 159 to the front end portion of the supporting plate 51. The spring 156 is normally effective to urge the lever 151 to rotate in a counter-clockwise direction, as viewed in Fig. 10, and thereby urges the rack 141 to move to the left as viewed in that figure.

The rack 141 is normally releasably held in the normal unactuated position shown in Fig. 4, by a trigger mechanism 161 which includes a trip lever 163, having a forwardly projecting leg 163a and a rearwardly projecting leg 163b, pivotally mounted at one end to the supporting plate 51 by a screw 164, and a trigger lever 166 connected to the free end portion of the leg 163a of the trip lever 163 by a pin 168 extending through a slot 169 formed in an ear 170 projecting from the central portion of the trigger lever 166. As is best seen in Figs. 4, 5, and 6, the trip lever 163 is mounted on the pin 164 in such position that the free end portion thereof, to which the trigger lever 166 is attached, projects forwardly therefrom or that is, to the left as viewed in Fig. 4, and the trigger lever 166 is disposed in substantially upright position with the slot 169 also extending substantially in a vertical direction. A tension coil spring 171 connected between the trip lever 163 and the trigger lever 166 yieldingly urges the trigger lever 166 upwardly relative to the trip lever 163, and urges it to rotate in a counter-clockwise direction on the pin 168, as viewed in Fig. 4, a stop 174 on the bracket 157 engaging the trigger lever 166 and limiting such rotation on the pin 168.

Another tension coil spring 177, connected at one end to the pin 168 and connected by a pin 184 at the other end to the supporting plate 51 urges the trip lever 163 to pivot in a counter-clockwise direction and is normally effective to yieldingly retain the trip lever 163 in normal, unactuated position as shown in Fig. 4.

A lever 107a, Fig. 4, which is, in effect at least, an extension of the lever 107, Figs. 2 and 10, and having a hub 107b is mounted on an end of the shaft 113 which projects from the rack side of the supporting plate 51, and is secured to the shaft 113, for rotation therewith, by a screw 307. The lever 107a has a head 107c and an ear 107d, Fig. 4, which are movable into and out of the path of movement of the pin 122 and the leg 163b of the lever 163, respectively, to thereby control the movement of the guard 108 and the trip lever 163, as will be discussed in greater detail hereinafter.

A notch 172 is formed in the front edge of the upper end portion of the trigger lever 166 and is normally disposed in position wherein a pin 173 on a lever 175, pivotally mounted by a pin 176 to the front end portion of the rack bar 141 is engaged therein. The lever 175 is normally disposed in substantially horizontally extending position parallel to the rack bar 141 and is connected at its rear end portion to the rack bar 141 by the pin 176. A roller 178 is rotatably mounted on a pin 179 carried by the front end portion of the lever 175 and is normally engaged with a stop shoulder 180 formed on the upper edge surface of the bracket 157. A tension spring 182 is connected between the pin 179 and one of the screws 159 disposed therebelow and is effective to yieldingly urge the front end portion of the lever 175 downwardly toward the upper edge of the bracket 157 and, therefore, is effective, when the lever 175 is disposed in normal position, as shown in Fig. 10, to yieldingly hold the roller 178 in abutting relation to the shoulder 180. Thus, it will be seen that when the lever 175 is disposed in the aligned position relative to the rack bar 141 shown in Fig. 10, wherein the roller 178 on the front end portion of the lever 175 is yieldingly held by the spring 182 in engagement with the stop shoulder 180, the lever 175 is effective to hold the rack bar 141 against the urging of the spring 156 and is thereby effective to hold the rack bar 141 in the normal position shown in Fig. 4, and to restrain the rack bar 141 from forward movement away from that position.

The upper edge portion of the bracket 157 is shaped to afford an upwardly inclined cam surface 182 leading forwardly from the shoulder 180 to a substantially horizontally disposed surface 183. It will be seen that if the roller 178 is moved upwardly from the position shown in Fig. 4 to a position wherein the roller 178 is disengaged from the shoulder 180, the spring 156 becomes effective to move the rack bar 141 forwardly or to the left as shown in Fig. 4, with the roller riding on the cam surface 182 toward the horizontal surface 183. It is such a movement of the rack bar 141 that is effected during each cycle of operation of my machine, as will be presently discussed.

Four key slides 185a, 185b, 185c and 185d, Figs. 4, 4A and 4B are slidably mounted on the supporting plate 51 for longitudinal movement in a substantially vertical direction between the bracket 157 and the supporting plate 51. A pin 187 extends through slots 188 formed in the lower end portion of the key slides 185a—185d, and a block 189 mounted on the bracket 157 in engagement with the rear edge portion of the key slides 185a—185d, is effective to hold the front edge portion of the key slides 185a—185d in engagement with a roller 181 rotatably mounted on one of the screws 159 on the bracket 157. Another roller 181a mounted on another one of the screws 159 directly above the roller 181 affords another guide roller for supporting the upper end portion of the key slides 185a—185d during reciprocation thereof, the roller 181a being normally disposed above the key slides 185a—185d in spaced relation thereto but being engaged by the slides 185a—185d during reciprocation of the latter. Elongated spacer bars or strips 192 are mounted on each side of each of the key slides 185a—185d to thereby hold the key slides 185a—185d in spaced relation relative to each other and to space the key slides 185a from the supporting plate 51. The spacer bars are held against vertical movement by the pin 187 which extends through closely fitting holes formed in the spacer bars 192.

The key slides 185a—185d each have two rearwardly extending ears 193 and 194 formed thereon, the ears 193 being disposed at the upper end portion of the key slides 185a—185d to engage the front end portion of the rack bar 141 and the ears 194 being disposed in the lower end portion of the key slides 185a—185d to engage an ear 196 formed on the front end portion of the trip lever 163. The ear 196 on the trip lever 163 extends horizontally across and above the lower ears 194 on the key slides 185a—185d, whereby upward movement of any one of the key slides 185a—185d is effective to pivot the trip lever 163 in a clockwise direction, as viewed in Fig. 4, and thereby raise the trigger lever 166 to release the roller 178 from holding engagement with the shoulder 180 as will be further discussed presently.

Four stop shoulders 198a, 198b, 198c and 198d, are formed on the front end portion of the rack bar 141, and are disposed in the same vertical plane as the ears 193 on the key slides 185a—185d, respectively. Thus, it will be seen that when any one of the bosses 193 on the key slides 185a—185d is moved upwardly into horizontal alignment with the respective one of the shoulders 198a—198d, that boss 193 is effective to engage the corresponding shoulder 198a—198d during forward movement of the rack bar 141, and to stop such movement of the rack bar 141 in a predetermined position. It is the key slides 185a—185d co-acting with the shoulders 198a—198d, as will be discussed in greater detail presently which determines the extent of movement of the rack bar 141, and, therefore, the number of tickets T issued from my machine, during a cycle of operation of my machine.

Four key levers 201a—201d are pivotally mounted by a pin 202 on the supporting plate 51 forwardly of the key slides 185a—185d, Figs. 4 and 4A. The key levers 201a—201d are normally disposed in substantially horizontal position, Fig. 4, and each embodies an ear 204 projecting longitudinally from the rear end portion thereof and an ear 205 projecting forwardly from the front end portion thereof. The ear 204 on each of the key levers 201a—201d project into a recess 207 formed in the front edge portion of respective ones of the key slides 185a—185d.

Four key stems 207a—207d, Figs. 4, 7, 8, and 9, are mounted in upright position on a channel bracket 208, which is secured to the front end portion of the supporting plate 51 and extends substantially transversely thereto. The bracket 208 has a rearwardly projecting upper flange 209 and the key stems 207a—207d extend through openings formed in the latter and are slidably held for vertical movement through the flange 209 by pins 212a—212d mounted in the key stems 207a—207d and extending through vertically extending slots 213a—213d formed in the bracket 208.

The front ears 205 on the key levers 201a—201d extend forwardly through the key stems 207a—207d and the slots 213a—213d respectively, whereby movement of the key stems 207a—207d in a vertical direction is effective to rock the key levers 201a—201d, respectively, on the pin 202 and effect corresponding vertical movement of the key slides 185a—185d connected to the rear end portion of the key levers 201a—201d by the ears 204 extending into the recesses 207.

The upper end portions of the key stems 207a—207d extend upwardly through the top plate 53 of the respective ticket issuing units A, B, or C and, when that ticket issuing unit A, B, or C is disposed in normal operating position in the casing 25, the upper end portion of the key stems 207a—207d extend upwardly through the bracket 42 on the arm rest 32.

Three discs or rollers 215a, 215b, and 215c having pins 216 extending through the center thereof are mounted on the bracket 208 beneath the lower end portions 206a, 206b, 206c and 206d of the key stems 207a—207d, respectively, the pins 216 extending forwardly through a substantially horizontally extending elongated slot 218 formed in the bracket 208, and the slot 218 terminating at opposite ends substantially below the key stems 207a and 207d, respectively. Two leaf springs 220 and 221, Figs. 4 and 10, made of suitable material, such as, for example, spring-steel wire, are mounted at one end to a bolt 223 mounted in and extending through the supporting plate 51 and have their other ends engaged in the pins 216 in the rollers 215a and 215c, respectively. The springs 220 and 221 are normally effective to yieldingly hold the rollers 215a—215c in abutting relation such as shown in Fig. 7, with the pins 216 in the end rollers 215a and 215c disposed inwardly of the adjacent respective ends of the slot 218, and with the vertical center lines of the rollers 215a—215c disposed substantially midway between respective adjacent pairs of the key stems 207a—207d.

The lower end portions 206a—206d of the key stems 207a—207d are tapered, Fig. 7, whereby downward movement or actuation of any one of the stems 207a—207d is effective to cam the three rollers longitudinally of the slot 218 to thereby dispose each of the rollers 215a—215c below and substantially in vertical alignment with a respective one of the other three of the key slides 207a—207d to thereby prevent actuation of the other key slides 207a—207d while the first mentioned key slide remains in depressed or actuated position. In this manner, it will be seen that an operator is prevented from either accidentally or intentionally depressing more than one key at a time. It will be seen that, when a key stem 207a—207d is depressed, the springs 220 and 221 urge the discs 215a—215c toward normal position and thereby urge the depressed key stem to move upwardly toward normal position. I provide a latching plate 224 pivotally mounted on the pin 181, Figs. 4 and 5, for holding the actuated key stem in depressed position until toward the close of the cycle of operation of the machine. As is best seen in Figs. 4 and 5, the lower end portion of the latching plate 224 is, at all times, yieldingly held in engagement with the front edge of the lower end portion of the trigger lever 166 by a tension coil spring 228 connected between the lower end portion of the latching plate 224 and a pin 230 projecting from the supporting plate 51. The front edge of the lower end portion of the trigger lever 166 is so shaped that upon upward movement of the trigger lever 166 the latching plate 224 is permitted to pivot on the pin 181 in a counter-clockwise direction, as viewed in Fig. 4, to thereby move the upper end portion of the latching plate 224 forwardly into latching engagement with a tooth 194a on the ear 194 to thereby hold the actuated key slide 185a—185d in raised position and thereby hold the actuated key lever 201a—201d and the actuated key stem 207a—207d in actuated position. Movement of the trigger lever 166 downwardly toward the close of the cycle of operation is effective to cam the latching plate 224 in a clockwise direction to thereby free the actuated key slide and permit the actuated key slide 185a—185d, the actuated key lever 201a—201d and the actuated key stem 207a—207d to be returned to normal position by the springs 177, 220 and 221.

A switch 225, Figs. 4, 5 and 6, for controlling the operation of the motor 84, and which is connected thereto by wires 226 and 227, is mounted on one end portion of a bell crank lever 229 which is pivotally mounted by a pin 231 on the supporting plate 51 on the rack side thereof. A roller or cam follower 232 is mounted on the other end portion of the bell crank lever 229 and is engaged with the peripheral edge portion of a cam 233 mounted on the drive shaft 93 on the rack side of the supporting plate 51 and which will hereafter be termed the "rack cam" to distinguish it from a cam 235 which is secured to the drive shaft 93 on the reel side of the supporting plate 51 and which will hereafter be called the "reel cam."

A roller 237 is mounted by a pin 238 on the end portion of the lever 151 opposite to the end which is connected to the rack bar 141 by the pin 154, and the roller 237 is disposed in radial alignment with the rack cam 233 in position to be engaged by the rack cam 233 during a cycle of operation as will presently be described.

A lever 241 which will hereafter be referred to as the "clutch lever" is pivotally mounted on the lever 151 between the pins 152 and 154 by a pin 242 which extends through the lever 241 and is secured to the lever 151. The clutch lever 241 is disposed in substantially upright position on the lever 151, and has a recess or slot 243 formed in the upper end portion thereof, and the upper end portion of the lever 241 is pivotally and slidably connected to a pin 245 which extends through the slot 243 and is attached to the supporting plate 51. An upwardly facing hook 247, Figs. 4 and 5 is formed on the lower end portion of the lever 241 and is normally engaged with a pin 248 mounted on the free end portion of a pawl or dog 250 pivotally connected by a pin 251 to the rack cam 233 to thereby normally hold the dog 252 on the pawl 250 in upwardly disengaged relation to the teeth 254 on a ratchet wheel 255 formed as an integral extension of the pulley 94 and journaled on the drive shaft 93 between the rack cam 233 and the driven pulley 94. the pawl 250 and the ratchet wheel 255 affording the driven member and driving member, respectively, of a one-revolution clutch. A tension spring 257 connected between the pin 248 and a pin 258 on the rack cam 233 yieldingly urges the pawl 250 toward engagement with the ratchet wheel 255.

It will be remembered that when the rack bar 141 is disposed in normal unactuated position, such as shown in Fig. 4 the hook 247 on the clutch lever 241 is engaged with the pin 248 on the pawl 250 to thereby hold the pawl 250 out of operative engagement with the ratchet wheel 255. At this same time, the roller 237 on the lower end portion of the lever 151 is disposed in spaced relation to the cam 233 and the lever 151 is engaged with the switch plunger 261 on the switch 225 to thereby hold the plunger 261 in inwardly disposed or switch-opening position, the lobe 233a of the rack cam 233 being engaged at this time with the roller 232 on the bell crank lever 239 to thereby positively hold the switch 225 in position wherein the lever 151 is effective to maintain the switch plunger 261 in switch-opening position.

Upon actuation of anyone of the key slides 207a—207d, the corresponding lever 201a—201d is rocked in a counter-clockwise direction, as viewed in Fig. 4, to thereby move the corresponding key slide 185a—185d upwardly into position to engage the corresponding stop shoulder 198a—198d on the rack bar 141, the upward movement of the key slide 185a—185d being effective to pivot the lever 163 in a clockwise direction, as viewed in Fig. 4 to thereby raise the trigger lever 166 and, through the engagement of the pin 173 in the notch 172, raise the roller 178 out of engagement with the stop shoulder 180 on the bracket 157 and free the rack bar 141 for movement in a forward direction, the roller 178 riding upwardly on the cam surface 182 toward the horizontal surface 183 on the bracket 157. Thus, for example, by comparison of Figs. 4 and 5, it will be seen that upon actuation of the key 207d, the key actuated to initiate a cycle of operation wherein four tickets are issued by my machine, the lever 201d is rocked in a clockwise direction to thereby raise the key slide 185d into position wherein the boss 193 thereon is disposed in horizontal alignment with the stop shoulder 198d on the rack bar 141, and the lever 175 on the rack 141 has been dislodged by the trigger 166 with the stop shoulder 180 to thereby permit the rack 141 to move forwardly into position wherein the shoulder 198a abuts the boss 193 on the key slide 185a.

Such movement of the rack bar 141 in a forward direction is effective to rotate the lever 151 in a counter-clockwise direction as viewed in Figs. 4 and 5, around the pin 152 and thereby cause the clutch lever 241 to be rotated in a clockwise direction around the pin 242. The movement of the lever 151 in a counter-clockwise direction, also, is effective to move the lower end portion thereof out of engagement with the switch plunger 261 to thereby permit the switch 225 to close and effect energization of the motor 84 to thereby cause the drive pulley 91 to rotate and, through the belt 96, rotate the driven pulley 94 and the ratchet wheel 255 in a counter-clockwise direction as viewed in Fig. 4.

The aforementioned clockwise movement of the lever 241 is effective to move the hook 247 out of clutch disengaging relation to the pin 248, and thereby permits the pawl 250 to be pivoted by the spring 257 in a counter-clockwise direction on the pin 251 and effect engagement of the pawl tooth 252 with one of the teeth 254 on the ratchet wheel 255 to thereby operatively connect the rack cam 233 and the reel cam 235 to the pulley 94 for rotation thereby.

During the initial movement of the cam 233 in a ticket issuing cycle of operation, the lobe 233a on the cam 233 is rotated out of engagement with the roller 232 on the bell crank lever 229 to thereby permit the lever 229 to rotate in a counter-clockwise direction, as viewed in Fig. 4 into position wherein it engages the stop screw 261 mounted in and projecting from the rack side of the supporting plate 51. The counter-clockwise direction of the cam 233 carries the leading edge of the lobe 233a into engagement with the roller 237 on the lever 151 during approximately one-quarter of a revolution of the cam 233, Fig. 5. Thereafter, further rotation of the cam 233 is effective to cause the lobe 233a to ride on the roller 237 and thereby rotate the lever 151 in a clockwise direction on the pin 152. This clockwise rotation of the lever 151 is effective to return the rack bar 141 to its normal position shown in Figs. 4 and 6.

Normally, after one of the keys 207a—207d have been actuated by the operator and during a ticket issuing cycle of operation, the operator removes his finger from the actuated key and, therefore, as the rack bar 141 is moved rearwardly by clockwise rotation of the lever 151 by the cam lobe 233a, the pin 173 on the lever 175 engages the leading edge of the trigger 166 and rotates the trigger 166 around the pin 168 to thereby press forwardly on the lower end of the plate 224 and thereby move the upper end portion of the plate 224 rearwardly out of alignment with the tooth 194a and permit the actuated one of the key slides 185a—185d to move downwardly, the springs 220 and 221 urging the discs 215a—215c back to normal position and thereby camming the key stems 207a—207d upwardly. The downward movement of the key slides 185a—185d permits the lever 163 to rotate in a counter-clockwise direction on the pin 164 and thereby lower the trigger 166 into position wherein the pin 173 again moves into normal position in the notch 172 on the upper end portion of the trigger 166. However, the connection between the trigger 166 and the lever 163 is such that even if the operator retains his finger on the actuated one of the keys 207a—207d, and thereby holds the actuated one of the key slides 185a—185d in upwardly disposed position, another cycle of operation may not be initiated until the depressed key is released and the same or another key again depressed. In such an event the pin 173 instead of riding normally into the notch 172 will engage the leading edge of the trigger 166 and cause the trigger 166 to rotate on the pin 168, the pin 173 riding downwardly along the leading edge of the trigger 166 to thereby permit the roller 178 on the lever 175 to move into normal position wherein it is disposed in engagement with the stop shoulder 180 on the bracket 157. With this construction, it will be seen that an operator is prevented from accidentally, or intentionally, initiating a second cycle of operation of my machine by failing to release any one of the keys 207a—207d.

It will be remembered that during approximately the first one-quarter of a complete revolution of the cam 233 the cam lobe 233a is moved into engagement with the roller 237 on the lever 151 and that during continued rotation of the cam 233 the lever 151 is rotated thereby in a clockwise direction to thereby return the rack bar 141 to its normal position shown in Figs. 4 and 6. The return of the rack bar 141 to its normal position is completed at the point in a cycle of operation wherein the cam 233 has completed substantially three-fourths of a complete revolution, at which point in the cycle of operation, the outermost portion of the lobe 233a on the cam 233 is engaged with the roller 237 on the lever 151.

However, although the lever 151 is returned to normal position at approximately three-fourths of a complete revolution of the cam 233, it will be seen that the lobe 233a has not yet moved into engagement with the roller 232 on the bell crank lever 229, and, therefore, the bell crank lever 229 is disposed in engagement with the stop 261, wherein the switch 225 is disposed in such position that the switch plunger 261 is spaced from the lower end of the lever 151. After approximately four-fifths of a complete revolution of the cam 233, the leading edge of the lobe 233a moves into engagement with the roller 232 on the bell crank lever 229 and thereafter continued movement of the lobe 233a is effective to press the roller 232 downwardly and thereby rotate the bell crank lever 229, in clockwise direction, as viewed in Fig. 4, and thereby move the switch 225 toward the lever 151 and cause the switch plunger 261 to abut, and be pressed inwardly by, the leading edge of the lever 151 and again open the switch 225 and thereby shut off the motor 84.

As shown in Fig. 6, at substantially the time that the lobe 233a on the cam 233 moves into engagement with the roller 232 on the bell crank lever 229, the pin 248 on the pawl 250 was carried by the rotation of the cam 233 into engagement with the hook 247 on the clutch lever 241 and during the last portion of a complete revolution of the cam 233, which occurs between the position shown in Fig. 6 and the position shown in Fig. 4, the pawl 250 is raised out of engagement with the ratchet wheel 255 to thereby disengage the cam 233 from driven connection with the drive shaft 93, the clutch lever 241 also acting as a positive stop for the cam 233 and preventing overrun of the cams 233 and 235 upon the completion of a single rotation.

While the rack cam 233 on the rack side of the supporting plate 51 has been moved through a complete revolution, during a ticket issuing cycle of operation, the reel cam 235 which, as previously mentioned is also pinned to the drive shaft 93, has likewise made a complete cycle of operation. The reel cam 235, Fig. 10, has a substantially circular shaped inner cam surface 265 and a substantially circular shaped outer cam surface 266, the inner cam surface 265 being connected to the outer cam surface 266 by a leading edge portion 267 and a trailing edge portion 268.

When the rack bar 141 is disposed in normal unactuated position as shown in Fig. 4, prior to actuation of a ticket issuing cycle of operation of my machine, the inner cam surface 265 of the cam 235 is engaged with a roller 271, Fig. 10, which is fastened to the rear end portion of a lever 272 by means of a screw 273. The lever 272 is pivotally mounted on the supporting plate 51 on the reel side thereof by means of a screw 275 and the forward end portion thereof is in engagement with the lower arm 278, Figs. 12 and 15, on a bell crank lever 279 which is pivotally mounted by a pin 282 on an arm 280, which is fastened to and projects outwardly from the reel side of the supporting plate 51. The upper end portion of the upper arm 283 of the bell crank lever 279 is engaged with the hub or knob 284 on an indexing plate 285 mounted on the rear end portion 286 of the shaft 288, journaled in the supporting plate 51, the other end of the shaft 288 forming the pinion 143, which it will be remembered, is engaged with the teeth 148 on the rack bar 141.

The indexing plate 285 is of the type disclosed in my aforementioned Patent No. 2,321,545, and includes a pin 291 slidably mounted in a sleeve 292, Fig. 16, which is attached to the outer side of the peripheral edge portion of the indexing plate 285, and the pin 291 is urged inwardly by a spring 293 mounted within the sleeve 292 so that it normally projects inwardly from the indexing plate 285 and is adapted to engage in any one of the several holes 295 in the reel 106, with which it is aligned when the indexing plate 285 is pressed inwardly during the operation of my machine, as will be presently described. As is best seen in Figs. 10 and 12, the reel 104 has holes 295 extending therethrough which are in radial alignment with the peripheral pins 110. It will be noted that the slidable mounting of the pin 291 is a safety measure so that if it should happen that the reel and the indexing plate should get out of alignment so that when the indexing plate is pressed inwardly the pin 291 is not in alignment with a hole 295 in the reel but engages the solid outer face of the reel 106, the pin 291 will move inwardly against the action of the spring 293 and thereby prevent jamming and straining of the parts.

It will be remembered that in general, the operation of a unit of my machine consists in moving the rack 141 forwardly a predetermined amount while the index plate 285 is disengaged from the reel 106 and thereby rotate the indexing plate 285 in a clockwise direction, as viewed in Fig. 10, so that the pin 291 in the indexing plate 285 is moved into axial alignment with a predetermined one of the holes 295 in the reel 106; and thereafter press the indexing plate 285 inwardly so as to engage the pin 291 with the hole 295 aligned therewith; and then move the rack 141 back to its normal position, as shown in Fig. 10, and thereby turn the pinion 143, the indexing plate 285 and the reel 106 the predetermined amount fixed by the distance through which the rack 141 had been moved forwardly, so that the pins 110 on the reel 106, and which are in engagement with the tickets T, are caused to move through a predetermined circumferential distance, determined by the distance through which the rack 141 and the indexing plate 285 themselves move to return to their normal positions. The controlled movement of the reel 106 thereby advances the proper number of tickets T upwardly through the shield 108 and the trap door 77.

It will be remembered that the upper end portion of the arm 283 of the bell crank lever 279 is engaged with the hub 284 of the indexing plate 285 so that when the lower arm 278 of the bell crank lever 279 is depressed, the upper arm 283 of the bell crank lever 279 will press the indexing plate 285 inwardly and thereby engage the pin 291 carried thereby with a hole 295 in the reel 106 with which it is axially aligned.

As previously mentioned, the indexing plate 285 is mounted on the reel side end portion of the shaft 288, and a spring 297 is mounted in a cavity 298 formed in the reel end portion of the shaft 288 and presses outwardly on the hub 284 of the indexing plate 285 and thereby urges the indexing plate 285 out of engagement with the reel 106. When the inner cam surface 265 of the cam 235 is engaged with the roller 271 on the lever 272 in the position shown in Fig. 10, the outer cam surface 266 of the cam 235 is engaged with a roller 301 which is fastened to the intermediate portion of a lever 302 by means of a pin 303. The lever 302 is pivotally mounted at its lower end to the reel side of the supporting plate 51 by means of a screw 305, and projects upwardly therefrom toward the reel 106. The lever 302 has a relatively long leg 307 extending upwardly from the pin 305 and a short leg 308 projecting upwardly and rearwardly from the upper end portion of the leg 307.

Five pins 310, Figs. 10 and 15, project laterally outwardly from the reel 106, each of the pins being disposed substantially midway between two adjacent peripheral pins 110. The leg 308 on the lever 302 is of such size that when the reel 106 is disposed in unactuated position as shown in Fig. 10, the upper end portion of the forward edge of the leg 307 is disposed in abutting engagement with one pin 310 and the rear end portion of the upper longitudinal edge of the leg 308 is disposed in abutting relation to the pin 310 next adjacent to the first mentioned pin 310 in a clockwise direction as viewed in Fig. 10.

A bell crank lever 312 having two legs 313 and 314 is pivotally mounted on the upper end portion of the leg 307 of the lever 302 by means of a pin 316. A lug 318 is formed on the free end portion of the leg 313 of the lever 312 and projects inwardly toward the supporting plate 51 and is yieldingly held in engagement with the forward edge portion of the leg 307 by a tension coil spring 319 connected between the lug 318 and the lever 272. The free end portion of the leg 314 is tapered and, when the lug 318 is disposed in engagement with the forward edge portion of the leg 307, projects upwardly from the upper longitudinal edge portion of the leg 308 and abuts the pin 310 which is disposed in abutting relation to the upper edge of the leg 308. At this same time the front edge portion of the leg 313 of the lever 312 abuts the pin 110 engaged by the leg 307 of the lever 302. Thus, it will be seen that with the lever 302 disposed in the normal position shown in Fig. 10, the reel 106 is positively held against rotation in either direction by the levers 302 and 312.

A knife actuating lever 321 is pivotally mounted on the reel side of the supporting plate 51 by means of a screw 322, and the lower end portion 323 thereof is adapted to engage a roller 325 mounted on the cam 235 by means of a pin 326. The upper end portion of the lever 321 has a slot 328 formed therein and the knife 116, Figs. 10, 13 and 14, which has a blade 329 and a downwardly depending shank 331, is mounted on the upper end portion of the lever 321 with the shank 331 of the knife 116 disposed in alignment with the upper end portion of the lever 321. The shank 331 of the knife 116 comprises a flat strip of metal having a slot 333 in its lower end portion and is mounted on the lever 321 in the slot 328 in such position that the slots 328 and 333 disposed in interlocking relation to each other. Two coil tension springs 334 and 335, Fig. 14, are mounted on opposite sides of the lever 321 and are connected between the shank 331 and a pin 337 extending through the lever 321, to thereby normally yieldingly retain the shank 331 in downwardly disposed position on the lever 321. The upper end portion of the shank 331 of the knife 116 extends through the central portion of the knife blade 329 and has an enlarged head 339 thereon which overlies the blade 329. In assembling the knife 116 the shank 331 may be dropped downwardly through the opening in the blade 329 to the position wherein the head 339 overlies the blade 329 in engagement therewith. The knife blade 329 rests on the plate 341 mounted on the top plate 53 of the unit in position to overlie the opening 114 in the plate 341. It will be remembered that the opening 114 in the plate 341 is disposed above, and adjacent to the upper end of the guide plate 104, and it is through this latter opening 342 that the tickets T are moved upwardly from the guide 104 toward the trap door 77. The portion of the plate 341 defining the forward edge of the opening 114 is beveled to form a cutting edge 343 and the forward edge of the knife blade 329 is correspondingly beveled to form a cooperating cutting edge 345. Thus when tickets T are moved upwardly through the opening 342 and the knife blade 329 is moved forwardly thereagainst, the cutting edges 343 and 345 are effective to shear the upwardly projecting tickets from the tickets remaining in the machine.

It will be seen that with this construction of the knife 116, if for any reason the knife blade 329 during a reciprocation thereof should strike an obstruction at either the leading or trailing edge thereof, the blade 329 and the shank 331 of the knife 116 are free to move upwardly away from the plate 341 against the urging of the springs 334 and 335 and the blade knife 329 is free, to a limited extent, to pivot on the shank 331, and thus it will be seen that a yielding connection is afforded between the knife blade 329 and the lever 321 whereby if an obstruction is met by the knife blade 329 the resulting movement of the knife blade 329 and the shank 331 prevents excessive strain from being placed on the lever 321 or the interconnection thereof with the knife blade 329.

In addition, it will be seen that the plate 341 on which the knife blade 329 slides is disposed at an angle to the horizontal with the front end portion thereof disposed above the rear end portion. The pivot pin or screw 322 of the knife-actuating lever 321 is so disposed relative to the plate 341 that, when the knife 116 is disposed in fully actuated position, as shown in Fig. 11, the upper end portion of the lever 321 is disposed substantially perpendicular to the knife blade 329 and to the plate 341, and, when the knife 116 is disposed in normal, unactuated position shown in Fig. 10, the knife has moved upwardly on the plate 341 and is disposed further away from the screw 322 than when it is disposed in the position shown in Fig. 11. Thus, during movement of the knife blade 329 in a cutting-stroke, from the position shown in Fig. 11 to the position shown in Fig. 10, the tension of the springs 334 and 335 acting on the blade 329 is increased so that during a cutting operation close-fitting relation of the knife blade 329 to the plate 341 is assured. Also, it will be seen that this slidable mounting of the knife-blade 329 on the plate 341 affords a self-sharpening cutting device.

With the parts of my novel machine disposed in normal or unactuated position, as shown in Figs. 4 and 10, the roller 325, Fig. 10, is engaged with the lower end portion 323 of the lever 321 in such manner that the lever 321 is disposed in such position that the knife blade 329 is disposed over the slot 114 in position to prevent the upward movement of the tickets T through the slot 114. The lower end portion 323 of the lever 321 is bifurcated having a downwardly extending leading tip 347 and a trailing tip 348. The roller 325 is normally engaged with the leading tip 347 in position to hold the lever 321 in the aforementioned normal position wherein the knife blade 329 is disposed in ticket-stopping position over the slot 114. During the initial rotation of the rack cam 233 in a cycle of operation from the position shown in Fig. 4 to the position shown in Fig. 5, the cam 235 is similarly rotated with the drive shaft 93 from the position shown in Fig. 10 to the position shown in Fig. 11, during which movement, the roller 325 moves out of engagement of the leading tip 347 of the lever 321 and then into and out of engagement with the inner face 348a of the trailing tip 348. The inner face 348a of the trailing tip 348 is so disposed on the lever 321 that as the roller 325 moves therepast it is effective to rotate the lever 321 on the pin 322 in a counter-clockwise direction, as viewed in Figs. 10 and 11 to thereby move the knife blade 329 rearwardly out of covering relation to the path of travel of the tickets T upwardly through the slot 114. Toward the close of a cycle of operation and after the tickets T have been issued upwardly from the slot 114 the roller 325 on the cam 235 moves into engagement with the leading edge 347a of the leading tip 347 and thereby presses the lower end portion 323 of the lever 321 rearwardly to pivot the lever 321 on the pin 322 in a clockwise direction and return the knife blade 329 to normal covering position relative to the slot 114. This returning movement of the knife blade 329 is effective through the co-action of the cutting edges 345 and 343 to sever the tickets which have been issued from the machine from the tickets T remaining in the machine, as previously mentioned.

A counting mechanism 351 which consists of a standard counter having a ratchet wheel 352, is mounted in position on the top plate 353, Figs. 4, 5, 10 and 11, with the ratchet wheel 352 disposed in operative engagement with teeth 354 mounted on and projecting upwardly from the forward end portion of the rack bar 141, and the counter 351 is geared to tabulate the number of tickets issued from the respective units A, B, or C in accordance with the distance through which the rack bar 141 moves during a cycle of operation.

A lock 356 having the usual barrel 357 which may be rotated by a key 358 is mounted on the top plate 353 with the barrel 357 projecting downwardly therefrom, and a latch lever 360 is mounted on the barrel 357 in such position that when the barrel 357 is disposed in "locked" position, the lever 360 is disposed above the forward end portion of the lever 175 in restraining engagement therewith to thereby prevent the upward pivotal movement of the lever 175 on the pin 176 and thereby hold the roller 178 in engagement with the shoulder 180 in position effective to hold the rack bar 141 against forward movement.

When it is desired to "unlock" the particular units A, B, or C, the key 358 of the lock 356 may be rotated, to thereby rotate the barrel 357 and move the lever 360 from the "locking" position shown in Fig. 4 to the "unlocked" position shown in Fig. 5, in which latter position the lever 360 is disposed above the barrel 357 out of restraining relation to the lever 175 on the rack bar 141.

In addition to the locking of the individual units A, B, and C by the lock 356, it will be seen that the ticket-exhaust detector lever 307—307a also provides means for locking of the individual units.

Thus, for example, when the lever 107—107a is disposed in normal position shown in solid lines in Figs. 2 and 4, wherein the lower end portion of the lever 107 rests against tickets T threaded up over the front face of the plate 103 on the magazine 101, the lever 107a is held by the tickets in the position shown in solid lines in Fig. 4, wherein the ear 107d is held rearwardly sufficiently to be out of the path of travel of the arm 163b of the trip lever 163 and thereby permits rotation of the lever 163 in a clockwise direction by actuation of any one of the keys 207a—207d to initiate a cycle of operation of that particular unit of my machine. However, it will be seen that when the lower end portion of a ticket strip is fed up past the lower end of the lever 107, as the tickets in that particular unit are becoming exhausted, the lever 107 is no longer held by the tickets T and is pivoted by gravity through the slot 103a in the plate 103, Fig. 2a, into the position shown in broken lines in Figs. 2 and 4. This latter movement of the lever 107 is effective to correspondingly move the lever 107a into the position shown in broken lines in Fig. 4, in which position the ear 107d on the lever 107a is disposed beneath the arm 163b of the lever 163, in the path of travel thereof, and is effective to prevent further actuation of the trip lever 163 until the lever 107d is again moved out of "ticket-exhausted" position.

In both the normal position and the "ticket-exhausted" position of the lever 107—107a, as is best seen in Fig. 4, the head 107c is disposed beneath the pin 122 in the path of travel thereof along the slot 128, and is, therefore, effective to prevent opening of the guard 108. Upon rotation of the lever 107—107a in a clockwise direction from either of the positions shown in Fig. 4 to the position shown in broken lines in Fig. 5, such as, for example, by manual rotation thereof by the operator upon opening of the door 30 in the casing 25, the head 107c of the lever 107—107a is moved out of the path of movement of the pin 122 to thereby free the guard 108 for opening movement from the position shown in Figs. 4 and 10 to the position shown in Fig. 12 to thereby permit ready access to the reel 106 from the bottom and also through the opening 130, Fig. 12, from the top.

From the foregoing, it will be seen that the lever 107—107a affords an efficient ticket-exhaust detector which is effective to prevent actuation of the respective unit A, B, or C of my machine, after the ticket supply therefor has been depleted to the point wherein the lower end portion of the ticket strip T has moved above the lower end portion of the lever 107 and until a new supply of tickets has been inserted into the unit; and, also, the lever 107—107a affords a locking device which is effective to positively latch the guard 108 against opening until the lever 107 has been manually, or otherwise pivoted to the position shown in broken lines in Fig. 5, and, therefore, affords effective means for preventing unauthorized opening of the guard 108, it being necessary to open the door 30 of the casing 25 to reach the lever 107 for manually turning it to the position shown in broken lines in Fig. 5, and the door 30 normally being locked in closed position by a lock, not shown, to prevent the opening thereof by unauthorized persons.

The description of the construction of the preferred form of my novel ticket issuing machine, with the description of the construction of the various parts and their operation having now been made, it is deemed advisable to herein set forth a brief résumé of the operation of my machine and the operation of the parts therein in substantially the order in which the operation thereof occurs during the operation of my machine.

In the following description of the operation of my machine, so as to conform to the drawings submitted herewith and wherein for the sake of illustration I have chosen to show the operating parts of my machine as they would appear in issuing four tickets therefrom, I will confine the description to a cycle of operation wherein four tickets are dispensed. However, it will be readily understood that the machine illustrated herein is capable of dispensing 1, 2, 3, or 4 tickets depending upon the key which is depressed in the unit from which the tickets are to be issued, and the principal differences in the operation of the machine in issuing 1, 2, 3, or 4 tickets are that different key slides 185a—185d are actuated and, therefore, that the rack bar 141 in the actuated unit moves forwardly a different amount so that it travels through a greater or less distance during a cycle of operation of the machine, depending on the number of tickets to be issued.

Also, it will be understood that the machine shown herein, which will issue 1 to 4 tickets, is shown merely to illustrate a practical ticket issuing machine which embodies my invention and I do not wish to be limited thereto, because machines which issue a greater or smaller number of tickets may be used without departing from the purview of my invention.

Résumé of operation

In loading my machine, the door 30 in the front thereof may be opened and the magazine 101 to be loaded may be lifted forwardly therefrom. The magazine 101 may then be loaded with a supply of tickets T disposed in folded zig-zag stacked relation, as shown in Fig. 2. The leading edge of the tickets T may then be pulled upwardly from the magazine 101 and upwardly across the plate 103, and, with the lower end portion of the lever 107 held forwardly, and with the cover 31 removed from the casing 25, and the guard 108 pivoted upwardly into open position shown in Fig. 12, the magazine 101 may be re-inserted into operative position in the casing 25, and the leading end of the tickets T may be fed manually upwardly over the front face of the shield 104 into proper engaged position with the pins 110 projecting forwardly through the shield 104, or, in the event that the trailing end of the ticket strip which was previously in the machine is disposed below the pins 110 on the reel 106, the leading end of the new ticket strip may be suitably secured thereto such as by gluing or taping. The guard 108 may then be lowered into closed position shown in Fig. 10 to retain the ticket strip T in mounted position on the shield 104, the key 358 may be turned to unlock the lock 356, the cover 31 may be mounted in closed position on the casing 25, and the door 30 may be closed and locked, and the machine is then ready for operation.

Therefore, assuming that a customer has asked for four tickets, the operator or cashier in charge of the machine presses the No. 4 key on the unit which issues the desired tickets. Upon depression of the No. 4 key, the key stem 207d is moved downwardly from the position shown in Fig. 7 to the position shown in Fig. 9, whereby the tapered lower end portion 206d thereof is effective to cam the rollers 215a–c to the right, as viewed in Fig. 7 into position effective to hold the other key stems 207a–c in upwardly disposed position.

Downward movement of the key stem 207d is effective to pivot the key lever 201d about the pin 202 to thereby press the corresponding key slide 185d upwardly. During this upward movement of the key slide 185d the lug 194 thereon engages the ear 196 on the lever 163 and thereby moves the trigger 166 upwardly to pivot the lever 175 on the rack bar 141 upwardly out of restraining engagement with the shoulder 180 and free the rack bar 141 to the urging of the spring 156. The spring 156 is thereby rendered effective to pivot the lever 151 in a counter-clockwise direction on the pin 242 as viewed in Fig. 4, to thereby move the rack bar 141 forwardly into position wherein the shoulder 198d engages the boss 193 on the raised key slide 185d, as shown in Fig. 5. This counter-clockwise rotation of the lever 151 is effective to move the lower end portion thereof out of holding engagement with the plunger 261 on the switch 225 and thereby permit the switch 225 to close and effect energization of the motor 84 connected thereto and thus initiate rotation of the drive shaft 93, in a counter-clockwise direction, as viewed in Fig. 4. The aforementioned movement of the lever 151 is also effective to pivot the clutch lever 241 on the pin 242 in a clockwise direction to thereby move the hook 247 out of holding engagement with the pin 248 on the dog 250 and permit the dog 250 to move into engagement with the teeth 254 on the ratchet wheel 255 and operatively connect the cams 233 and 235 to the rotating drive shaft 93.

The forward movement of the rack bar 141 by the spring 156 and the lever 151 actuated the counter 351 and, in the case supposed, caused the counter 351 to register the sale of four tickets. In addition, the forward movement of the rack bar 141 operating through the engagement of the rack teeth 148 with the teeth on the pinion 143, turns the pinion 143 in a clockwise direction, as viewed in Fig. 10, thereby turning the indexing plate 285 in a clockwise direction from the position shown in Fig. 10 to the position shown in Fig. 11 so that the pin 291 on the indexing plate 285 is moved backwardly sufficiently to align with a hole 295 in the reel 106 which is four holes removed, in a clockwise direction from the normal position of the pin 291.

Upon the initial rotation of the drive shaft 93 in a counter-clockwise direction, as viewed in Fig. 4, wherein the cam 233 is moved from the position shown in Fig. 4 to the position shown in Fig. 5, and the cam 235 is moved from the position shown in Fig. 10 to the position shown in Fig. 11, the lobe 233a on the cam 233 is moved out of engagement with the roller 232 on the bell crank lever 229 to thereby permit the switch 225 to move forwardly into engagement with the stop 261, and the leading edge of the lobe 233a on the cam 233 moves into engagement with the roller 237 on the lower end portion on the lever 151.

Also during this initial rotation of the drive shaft 93 and the cams 233 and 235, the rotation of the cam 235 from the position shown in Fig. 10 to the position shown in Fig. 11, is effective to move the roller 325 into and out of engagement with the tip 348 on the lever 321 to thereby move the knife blade 329 out of ticket-blocking position over the slot 114. Also, it will be seen that this movement of the cam 235 is effective to move the outer cam surface into engagement with the roller 271 on the lever 272 to rotate the bell crank lever 272 and the bell crank lever 279 and thereby engage the indexing plate 285 with the ticket reel 106.

During this movement of the outer cam surface 266 into engagement with the roller 271, the outer cam surface 266 is moved out of engagement with the roller 301 on the lever 302 and thereby permits the lever 302 to be rotated in a counter-clockwise direction, as viewed in Fig. 10 on the pin 305 from the position shown in Fig. 10 to the position shown in Fig. 11 to thereby move the leg 308 of the lever 302 and the leg 314 of the lever 312 out of engagement with the pins 310. The leading edge 268 and the trailing edge 267 of the outer cam surface 266 are so disposed relative to the rollers 271 and 301, respectively, that the roller 301 is held by the outer cam surface 266 until the roller 271 is engaged by the cam surface 266, and, therefore, the legs 308 and 314 of the levers 302 and 312, respectively, are retained in holding engagement with the pins 310 until the indexing plate 285 is disposed in operable engagement with the reel 106.

Next, rotation of the cam 233 from the position shown in Fig. 5 toward the position shown in Fig. 6, is effective through the engagement of the leading edge of the lobe 233a with the roller 237 on the lever 151, to cause the lever 151 to rotate in a clockwise direction on the pin 152 until, when the tip of the lobe 233a passes the roller 237, the lever 151 has been moved back to its normal position shown in Figs. 4 and 6, and the rack bar 141 has been moved rearwardly by the latter from the actuated position shown in Fig. 5 back to its normal position shown in Figs. 4 and 6. Upon this movement of the rack bar 141, the lever 175 is pivoted downwardly by the spring 182 into position wherein the roller 178 thereon is disposed in abutting relation to the retaining shoulder 180 and the rack bar 141 is once again held in normal or unactuated position.

Rearward movement of the rack bar 141 from the position shown in Fig. 5 to the position shown in Fig. 6, rotates the pinion 143 in a counter-clockwise direction, as viewed in Fig. 11, which causes the indexing plate 285 to be rotated in a similar direction and thereby, because the indexing plate 285 is engaged with the reel 106, causes the reel 106 acting through the peripheral pins 110 to advance the ticket strip T the distance of four tickets so that the issued four tickets extend through the opening 114 in the top plate 53 and out through the trap door 77 in the cover plate 31 with the lower edge portion of the four issued tickets in alignment with the cutting edges 345 and 343 on the knife blade 329 and the blade 341, respectively. The rearward movement of the rack bar 141 has also caused the ratchet wheel 352 in the counter 351 to turn through an idle rotation. Also the rotation of the lever 151 has caused the lower end portion thereof to again be disposed in position to engage the plunger 261 on the switch 225 when the switch 225 is next moved into normal or unactuated position.

During rotation of the cam 233 from the position shown in Fig. 5 to the position shown in Fig. 6, the cam 235 is also rotated from the position shown in Fig. 11 to the position shown in Fig. 12. This latter rotation of the cam 235 causes the roller 325 carried thereby to move into engagement with the leading edge 347a on the leading tip 347 on the lower end portion 323 of the lever 321 and thereby pivots the lever 321 in a clockwise direction, as viewed in Fig. 12, and thereby moves the knife blade 329 forwardly into ticket restraining position over the opening 114 in the cover plate 53. This forward movement of the knife blade 329 is effective to sever the lower end portion of the four issued tickets from the tickets remaining in the machine.

During the rotation of the drive shaft 93 which is effective to carry the cam 235 from the position shown in Fig. 11 to the position shown in Fig. 12, the cam 233 is rotated from the position shown in Fig. 5 to the position shown in Fig. 6 during which movement the leading edge portion of the lobe 233a is moved into position wherein it has just started to engage the roller 232, and the pin 243 on the pawl 250 is moved into position wherein it is just ready to engage the hook 247 on the clutch lever 241.

The outer cam surface 266 on the cam 235 has again been moved into engagement with the roller 301 on the lever 302 to thereby move the legs 308 and 314 on the levers 302 and 312 respectively, back into holding engagement with the pins 310 and thereby latch the reel 106 in normal position. Here again the leading edge 267 and the trailing edge 268 of the outer cam surface 266 are so disposed relative to each other and rollers 271 and 301 that the outer cam surface 266 is moved into engagement with the roller 301, to thereby dispose the levers 302 and 312 in locking engagement with the pins 310 on the reel 106, prior to the time that the outer cam surface 266 is moved out of engagement with the roller 271, to thereby free the lever 272 to the action of the spring 319 and effect disengagement of the indexing plate 285 from the reel 106. Thus, it will be seen that at all times when the reel 106 is not operatively connected to the rack 141, it is positively latched by the levers 302 and 312.

Next, the continued rotation of the drive shaft 93 is effective to move the cam 235 from the position shown in Fig. 12 back to its normal or unactuated position shown in Fig. 10, and during this movement the roller 325 thereon is moved along the leading edge 347a on the leading tip 347 of the lever 321 into position wherein it is just ready to move out of engagement with the tip 347 but is still in engagement therewith, and is therefore, effective to hold the knife blade 329 in ticket-restraining position over the slot 114.

This latter rotation of the drive shaft 93 is also effective to move the rack cam 233 from the position shown in Fig. 6 back to the normal or unactuated position shown in Fig. 4, and during this movement, the lobe 233a on the cam 233 presses the roller 232 on the bell crank lever 329 downwardly to thereby rotate the bell crank lever 329 in a clockwise direction and move the plunger 261 on the switch 225 back into engagement with the lower end portion of the lever 151 to thereby open the switch 225 and de-energize the motor 84. This movement of the cam 233 is effective to carry the pawl 250 into unlatching engagement with the hook 247 on the clutch lever 241 to thereby raise the tooth 252 on the pawl 250 upwardly out of operative engagement with the teeth 254 on the ratchet wheel 255 and thereby disengage the cams 233 and 235 from the drive shaft 93, whereby any overrun of the motor 84 is rendered inoperative to effect any further operation of the ticket issuing unit until another key is actuated, thus ending the ticket issuing cycle of operation of my machine and positioning all the moved parts in their proper normal stationary positions, where they will remain until another ticket issuing cycle of operation is initiated.

From the foregoing description of the drawings and construction of my ticket issuing machine, in conjunction with the accompanying drawings, it will be apparent that I have provided a novel and practical ticket issuing machine embodying a novel combination of parts which operate in a novel and expeditious manner to effect ticket issuing operations.

Also, it will be noted that I have provided a ticket issuing machine embodying novel ticket severing mechanism for severing tickets issued from my machine during a cycle of operation.

In addition, it will be seen that I have provided a ticket issuing machine embodying a novel and practical clutch for connecting and disconnecting the operable parts of my machine from a suitable power source such as, an electric motor. Further, it will be noted that I have provided a novel switch mechanism for controlling the operation of an electric motor in the driving operation of my machine.

In addition, it will be seen that I have afforded a novel ticket issuing machine embodying a novel ticket-exhaust detecting device.

Also, it will be noted that the present invention accomplishes its intended objects, some of which have been specifically referred to hereinbefore and others of which will be apparent from the foregoing description taken in conjunction with the accompanying drawings.

Thus while I have illustrated and described the preferred embodiments of my invention, it is to be understood that these are capable of variation and modification, and I therefore do not wish to be limited to the precise details set forth, but desire to avail myself of such changes and alterations as fall within the purview of the following claims.

I claim:

1. A ticket issuing machine comprising a ticket feed reel, a motor, driving means for operatively connecting said motor to said reel for rotating the latter during a ticket issuing cycle of operation, said driving means comprising a slide member movably mounted for reciprocation between a normal and actuated position relative to said reel, a cam rotatably mounted relative to said slide member, said cam being operatively connected to said motor for rotation thereby during such a ticket issuing cycle of operation, means including said cam and operatively connected to said slide member during such a cycle of operation for reciprocating said slide, said last named means including a lever pivotally connected to said slide member and engageable by said cam for pivotal movement thereby during a cycle of operation to thereby move said slide in one direction, a pivotally mounted lever having one end portion disposed in position to be engaged by said cam during rotation of the latter, a switch operatively connected to said motor for controlling the latter, said switch being mounted on the other end portion of said last mentioned lever and movable thereby into operative engagement with said first mentioned lever for opening said switch and thereby effecting de-energization of said motor at the close of a cycle of operation.

2. A ticket issuing machine comprising a ticket feed reel, a motor, driving means for operatively connecting said motor to said reel for rotating the latter during a ticket issuing cycle of operation, said driving means comprising a slide member movably mounted for reciprocation between a normal and actuated position relative to said reel, a cam rotatably mounted relative to said slide member, said cam being operatively connected to said motor for rotation thereby during such a ticket issuing cycle of operation, means including said cam and operatively connected to said slide member during such a cycle of operation for reciprocating said slide, said last named means including an elongated pivotally mounted lever oscillatable through a predetermined path of movement during a cycle of operation, one end of said lever being disposed in the path of movement of said cam and engageable by said cam during a cycle of operation for moving said lever in one direction along said path of movement, the other end portion of said lever being operatively connected to said slide for moving said slide in one direction during said latter movement of said lever, another pivotally mounted lever movable between a normal position and an actuated position, means on said other lever engageable by said cam for moving said lever into said normal position at the close of a cycle of operation, and a switch operatively connected to said motor for controlling the operation of the latter, said switch being mounted on said other lever and movable thereby into operative engagement with said first mentioned lever during said movement of said other lever into said normal position to thereby open said switch and effect de-energizing of said motor at the close of said cycle of operation.

3. A ticket issuing machine comprising a ticket feed reel, a motor, driving means for operatively connecting said motor to said reel for rotating the latter during a ticket issuing cycle of operation, said driving means comprising a slide member movably mounted for reciprocation between a normal and actuated position relative to said reel, a drive shaft rotatably mounted relative to said slide member, said drive shaft being operatively connected to said motor for rotation thereby, a cam mounted on said drive shaft and normally freely rotatable relative thereto, clutch means mounted on said shaft for coupling said cam to said drive shaft for rotation by the latter during a cycle of operation, means, including a lever engageable by said cam and operatively connected to said slide, for reciprocating said slide during such a cycle of operation, and means comprising a lever pivotally mounted on said first mentioned lever for disengaging said clutch and thereby uncoupling said cam from said drive shaft at the close of such a cycle of operation.

4. A ticket issuing machine comprising a ticket feed reel, a motor, driving means for operatively connecting said motor to said reel for rotating the latter during a ticket issuing cycle of operation, said driving means comprising a slide member movably mounted for reciprocation between a normal and actuated position relative to said reel, a drive shaft rotatably mounted relative to said slide member, said drive shaft being operatively connected to said motor for rotation thereby, a drive member movably mounted on said reel and operatively connected to said slide member for rotation by said slide member upon reciprocation of the latter, said drive member being movable into and out of operative engagement with said reel for rotating said reel upon rotation of said drive member, means including a cam mounted on said drive shaft for moving said drive member into and out of said operative engagement with said reel, another cam mounted on said drive shaft, said cams being operatively connected together for rotation with each other and being normally freely rotatable relative to said drive shaft, clutch means mounted on said shaft for coupling said cams to said drive shaft for rotation by the latter during a cycle of operation, means, including a lever engageable by said other cam and operatively connected to said slide, for reciprocating said slide during such a cycle of operation, and means comprising a lever pivotally mounted on said first mentioned lever for disengaging said clutch and thereby uncoupling said cams from said drive shaft at the close of such a cycle of operation.

5. A ticket issuing machine comprising a ticket feed reel, a motor, driving means for operatively connecting said motor to said reel for rotating the latter during a ticket issuing cycle of operation, said driving means comprising a slide member movably mounted for reciprocation between a normal and actuated position relative to said reel, a drive shaft rotatably mounted relative to said slide member, said drive shaft being operatively connected to said motor for rotation thereby, a cam mounted on said drive shaft and normally freely rotatable relative thereto, clutch means for coupling said cam to said drive shaft for rotation by the latter during a cycle of operation, said clutch means comprising a ratchet wheel mounted on said drive shaft for rotation therewith, and a pawl pivotally mounted on said cam for movement into and out of coupling engagement with said ratchet wheel, means, including a lever engageable by said cam and operatively connected to said slide, for reciprocating said slide during such a cycle of operation, and another lever pivotally mounted on said first mentioned lever and movable thereby into position to engage said pawl for moving the latter out of coupling engagement with said ratchet wheel at the close of such a cycle of operation to thereby disengage said clutch and uncouple said cam from said drive shaft.

6. A ticket issuing machine comprising a ticket feed reel, a motor, driving means for operatively connecting said motor to said reel for rotating the latter during a ticket issuing cycle of operation, said driving means comprising a slide member movably mounted for reciprocation between a normal and actuated position relative to said reel, a drive shaft rotatably mounted relative to said slide member, said drive shaft being operatively connected to said motor for rotation thereby, a drive member movably mounted on said reel and operatively connected to said slide member for rotation by said slide member upon reciprocation of the latter, said drive member being movable into and out of operative engagement with said reel for rotating said reel upon rotation of said drive member, means including a cam mounted on said drive shaft for moving said drive member into and out of said operative engagement with said reel, another cam mounted on said drive shaft, said cams being operatively connected together for rotation with each other and being normally freely rotatable relative to said drive shaft, clutch means for coupling said cams to said drive shaft for rotation by the latter during a cycle of operation, said clutch means comprising a ratchet wheel mounted on said drive shaft for rotation therewith, and a pawl pivotally mounted on said other cam for movement into and out of coupling engagement with said ratchet wheel, means, including a lever engageable by said other cam and operatively connected to said slide, for reciprocating said slide during such a cycle of operation, and another lever pivotally mounted on said first mentioned lever and movable thereby into position to engage said pawl for moving the latter out of coupling engagement with said ratchet wheel at the close of such a cycle of operation to thereby disengage said clutch and uncouple said cams from said drive shaft.

7. A ticket issuing machine comprising a ticket feed reel, driving means for rotating said reel, said driving means including a driving member normally disengaged from said reel and movable into operative engagement therewith during a ticket issuing cycle of operation, and holding means connected to said driving means and operable thereby for holding said reel against rotation in a ticket issuing direction when said driving member is so disengaged from said reel, said holding means comprising a lever pivotally mounted relative to said feed reel, another lever pivotally mounted on said first mentioned lever and movable therewith, said first mentioned lever being engageable and movable by said driving means into and out of simultaneous engagement with two portions of said reel for holding said reel against rotation when said driving means are disengaged from said reel, said other lever being mounted on said first mentioned lever in such position that when said first mentioned lever is so disposed in engagement with said two portions of said reel said other lever is disposed between and in engagement with said two portions.

8. A ticket issuing machine comprising a ticket feed reel, driving means for rotating said reel, said driving means including a driving member normally disengaged from said reel and movable into operative engagement therewith during a ticket issuing cycle of operation, and a cam rotatable during operation of said driving means, and holding means pivotally mounted relative to said cam for holding said reel against rotation when said driving member is so disengaged from said reel, said holding means comprising a lever having an upper and lower end and including a roller mounted between said upper and lower end, said lever being pivotally mounted by its lower end in position wherein said roller is disposed in the path of movement of said cam, a bell-crank lever pivotally mounted at its midportion on the upper end portion of said first mentioned lever, the free end of one leg of said bell-crank lever having a lug engageable with said first mentioned lever to limit rotation of said bell-crank lever relative to said first mentioned lever in one direction, the free end of the other leg of said bell-crank lever being tapered to afford a cam surface, said holding means having an unlatching position wherein both of said levers are disposed out of engagement with said reel, said holding means also having a latching position wherein said first mentioned lever is disposed in holding engagement with two portions of said reel and said bell-crank lever is disposed between said two portions of said reel with said cam surface operatively engaged with one of said portions to cam the other of said portions toward engagement with said first mentioned lever, and means comprising said cam and a spring operatively connected to said bell-crank lever for moving said holding means between said unlatching and latching position in timed relation to the engagement and disengagement of said driving member relative to said reel.

9. A ticket issuing machine comprising a ticket feed reel, means connected to said reel for rotating the latter through a ticket issuing cycle of operation, said means including a rack slidably mounted relative to said reel and drivingly engaged therewith, means for moving said rack, and means for controlling the movement of said rack to thereby control the rotation of said reel, said last named means comprising a plurality of selector keys slidably mounted relative to said rack, an abutment on said rack, an abutment member normally engaging said abutment for holding said rack in a predetermined position, and means connected to said abutment and said keys for raising said abutment out of engagement with said abutment member upon depression of one of said keys to thereby free said rack for movement in one direction.

10. A ticket issuing machine comprising a ticket feed reel, means connected to said reel for rotating the latter through a ticket issuing cycle of operation, said means including a rack slidably mounted relative to said reel and drivingly engaged therewith, means for moving said rack, and means for controlling the movement of said rack to thereby control the rotation of said reel, said last named means comprising a plurality of selector keys slidably mounted relative to said rack, an abutment on said rack, an abutment member normally engaging said abutment for holding said rack in a predetermined position, and means including a plurality of slide members operatively connected to said keys and said abutment for moving said abutment out of engagement with said abutment member to thereby free said rack for movement in one direction from said predetermined position, each of said slide members being connected to a corresponding one of said keys and having abutment portions thereon movable into a selected portion of the path of travel of said rack upon said actuation of said slide member by said corresponding key to thereby selectively limit the movement of said rack in said one direction.

11. A ticket issuing machine comprising a supporting member, a ticket feed reel rotatably mounted on said supporting member, means for holding tickets in a predetermined position for feeding to said reel, means connected to said reel for rotating the latter through a ticket issuing cycle of operation, a guard member pivotally and slidably normally mounted on said supporting member in overlying relation to said reel for holding tickets to be issued on said reel, said guard member being pivotally and slidably movable on said supporting member from said normal position to an open position relative thereto, means mounted on said supporting member for controlling the operation of said means connected to said reel, said controlling means including a lever pivotally mounted on said supporting means and manually movable through an operative movement in one direction for initiating such a ticket-issuing cycle of operation, and a control member pivotally mounted on said supporting member and having a normal position and two actuated positions, said control member, when disposed in said normal position, having a portion disposed in the path of movement of a portion of said guard to thereby block movement of said guard from its said normal position to its said open position and being disposed out of the path of movement of said lever to thereby permit said operative movement of said lever and permit initiation of such ticket-issuing cycle of operation, said control member, when disposed in one of said actuated positions being disposed in the path of movement of said portion of said guard and of said lever to thereby prevent movement of said guard from its said normal to its said open position and prevent said operative movement of said lever and thereby prevent initiation of such a cycle of operation, said control member being normally engaged by tickets disposed in said predetermined area and held thereby in said normal position of said control member, said control member being automatically movable to said one actuated position when no tickets are disposed in said predetermined area, said control member being manually movable to the other of said actuated positions and, when so moved, being disposed out of the path of travel of said portion of said guard to thereby permit movement of said guard from its said normal position to its said open position.

12. A ticket issuing machine comprising a ticket feed reel, means connected to said reel for rotating the latter through a ticket issuing cycle of operation, said means including a rack slidably mounted relative to said reel and drivingly engaged therewith, means for moving said rack, and means for controlling the movement of said rack to thereby control the rotation of said reel, said last named means comprising a lever pivotally mounted on one end portion of said rack and normally disposed in substantially parallel extending relation thereto, an abutment member normally abutting one end of said lever to thereby hold said lever and said rack against longitudinal movement in one direction, and means for releasing said lever from said abutting relation to said abutment member to thereby free said lever and said rack for movement in said one direction, said last named means comprising a second lever pivotally mounted relative to said first mentioned lever, another lever pivotally and slidably mounted on said second lever and normally engaged with said first mentioned lever in lifting relation thereto, and keys operatively connected to said second lever for rotating the latter and thereby raising said other lever and thereby pivot said first mentioned lever out of said abutting relation to said abutment member and free said rack and said first mentioned lever for said movement in said one direction.

References Cited in the file of this patent

UNITED STATES PATENTS

| | | |
|---|---|---|
| 773,816 | Sielaff | Nov. 1, 1904 |
| 1,309,829 | Von Pein | July 15, 1919 |
| 2,041,831 | Helsel | May 26, 1936 |
| 2,103,720 | Helsel | Dec. 28, 1937 |
| 2,115,760 | Black et al. | May 3, 1938 |
| 2,156,931 | Williams | May 2, 1939 |
| 2,321,545 | Dodeggee | June 8, 1943 |
| 2,356,667 | Helsel | Aug. 22, 1944 |
| 2,419,012 | Dodeggee | Apr. 15, 1947 |
| 2,554,827 | Helsel | May 29, 1951 |